(12) United States Patent
Chillara

(10) Patent No.: US 12,379,489 B1
(45) Date of Patent: Aug. 5, 2025

(54) PROXIMITY SENSING USING PULSED ULTRASONIC SIGNALS

(71) Applicant: Amazon Technologies, Inc., Seattle, WA (US)

(72) Inventor: Vamshi Krishna Chillara, Quincy, MA (US)

(73) Assignee: Amazon Technologies, Inc., Seattle, WA (US)

( * ) Notice: Subject to any disclaimer, the term of this patent is extended or adjusted under 35 U.S.C. 154(b) by 221 days.

(21) Appl. No.: 18/124,971

(22) Filed: Mar. 22, 2023

(51) Int. Cl.
*G01S 15/10* (2006.01)
*G01S 15/00* (2020.01)
*G01S 15/62* (2006.01)

(52) U.S. Cl.
CPC .......... *G01S 15/101* (2013.01); *G01S 15/003* (2013.01); *G01S 15/62* (2013.01)

(58) Field of Classification Search
CPC ............................. G01S 15/003; G01S 15/62
See application file for complete search history.

(56) References Cited

U.S. PATENT DOCUMENTS

| | | | | |
|---|---|---|---|---|
| 2009/0296954 A1* | 12/2009 | Hooley | ................ | H04R 3/005 381/80 |
| 2012/0025964 A1* | 2/2012 | Beggs | .................. | G08G 1/166 340/435 |
| 2014/0309868 A1* | 10/2014 | Ricci | .................... | G06Q 10/00 701/36 |
| 2016/0058337 A1* | 3/2016 | Blahnik | .............. | A61B 5/1123 |
| 2016/0097855 A1* | 4/2016 | Qutub | ................. | H04R 29/004 367/99 |
| 2019/0125458 A1* | 5/2019 | Shelton, IV | ......... | A61B 17/072 |
| 2019/0125459 A1* | 5/2019 | Shelton, IV | .......... | G16H 40/63 |
| 2019/0206565 A1* | 7/2019 | Shelton, IV | .......... | A61B 90/90 |
| 2019/0302916 A1* | 10/2019 | Thomas | .................. | G01S 15/04 |

\* cited by examiner

*Primary Examiner* — Daniel L Murphy
*Assistant Examiner* — Amie M Ndure
(74) *Attorney, Agent, or Firm* — Eversheds Sutherland (US) LLP

(57) ABSTRACT

Techniques for proximity-sensing devices to detect movement of a person in an environment by emitting pulsed ultrasonic signals into the environment, and detecting a change in the energy measurements of the reflections of the pulsed ultrasonic signals off the person caused by the movement of the person relative to the proximity-sensing devices. In addition to detecting movement, and thus presence, of a person, the proximity-sensing devices may further perform techniques for identifying a direction of movement of the person, and also to perform techniques for identifying a number of people that are in the room. The use of pulsed ultrasonic signals, and monitoring changes in energy in reflections of the emitted signals over time, not only enables movement detection and tracking, but also requires less power and computing resources than continuous emission techniques.

20 Claims, 14 Drawing Sheets

700

```
┌─────────────────────────────────────────────────────────────┐
│  CAUSE THE LOUDSPEAKER TO EMIT A FIRST PULSED ULTRASONIC    │
│  SIGNAL INTO AN ENVIRONMENT OF THE PROXIMITY-SENSING DEVICE │
│                            702                              │
└─────────────────────────────────────────────────────────────┘
                              │
                              ▼
┌─────────────────────────────────────────────────────────────┐
│  RECEIVE, AT THE MICROPHONE, A FIRST REFLECTED SIGNAL OF    │
│  THE FIRST PULSED ULTRASONIC SIGNAL OFF AN OBJECT IN THE    │
│                       ENVIRONMENT                           │
│                            704                              │
└─────────────────────────────────────────────────────────────┘
                              │
                              ▼
┌─────────────────────────────────────────────────────────────┐
│  DETERMINE, USING THE FIRST REFLECTED SIGNAL, FIRST ENERGY  │
│                 OF THE FIRST REFLECTED SIGNAL               │
│                            706                              │
└─────────────────────────────────────────────────────────────┘
                              │
                              ▼
┌─────────────────────────────────────────────────────────────┐
│  CAUSE THE LOUDSPEAKER TO EMIT A SECOND PULSED ULTRASONIC   │
│       SIGNAL INTO THE ENVIRONMENT AT A FIRST TIME           │
│                            708                              │
└─────────────────────────────────────────────────────────────┘
                              │
                              ▼
┌─────────────────────────────────────────────────────────────┐
│  RECEIVE, AT A SECOND TIME, A SECOND REFLECTED SIGNAL OF    │
│        THE SECOND PULSED ULTRASONIC SIGNAL OFF THE OBJECT   │
│                            710                              │
└─────────────────────────────────────────────────────────────┘
                              │
                              ▼
                            (7B)
```

RECEIVE A FOURTH REFLECTED SIGNAL, CORRESPONDING TO THE SECOND PULSED ULTRASONIC SIGNAL, AT THE MICROPHONE, THE FOURTH REFLECTED SIGNAL ORIGINATING THE SECOND OBJECT
914

DETERMINE THIRD ENERGY ASSOCIATED WITH THE THIRD REFLECTED SIGNAL AND FOURTH ENERGY ASSOCIATED WITH THE FOURTH REFLECTION SIGNAL
916

DETERMINE, BASED AT LEAST IN PART ON THE FIRST ENERGY AND THE THIRD ENERGY, THAT THE FIRST OBJECT IS IN MOTION
918

DETERMINE, BASED AT LEAST IN PART ON THE SECOND ENERGY AND THE FOURTH ENERGY, THAT THE SECOND OBJECT IS IN MOTION
920

FIG. 9B

PROXIMITY SENSING USING PULSED ULTRASONIC SIGNALS

BACKGROUND

Many devices and technologies exist for detecting the presence of users in different environments, and for different purposes. For instance, motion-sensing lights are used to automate lighting control based on detecting motion, motion-sensing security devices can trigger alarms upon detecting motion, etc. These presence-sensing devices can utilize many different technologies to detect the presence and/or motion of a user in an environment, such as acoustic sensing, passive infrared sensing (PIR) sensing, Wi-Fi Channel Sate Information (CSI) sensing, radio-wave sensing, etc. To perform many of these types of presence-sensing techniques, the presence-sensing devices are often equipped with specialized hardware, such as specialized sensors, specialized processors, etc. However, the different types of specialized hardware required by presence-sensing devices to detect presence or motion can be disadvantageous for many reasons, such as the high cost to include in devices, consumption of large amounts of power, emitting large amounts of heat, etc. Additionally, beyond being able to detect presence or motion, existing presence-sensing devices are unable to provide further contextual information about the motion in the environment.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIGS. 7A and 7B collectively illustrate a flow diagram of an example process for using pulsed ultrasonic signals to detect a distance of an object in an environment, and also a direction in which the object is moving in the environment.

FIGS. 9A and 9B collectively illustrate a flow diagram of an example process for using pulsed ultrasonic signals to detect movement of multiple objects in an environment.

DETAILED DESCRIPTION

Figure 1:
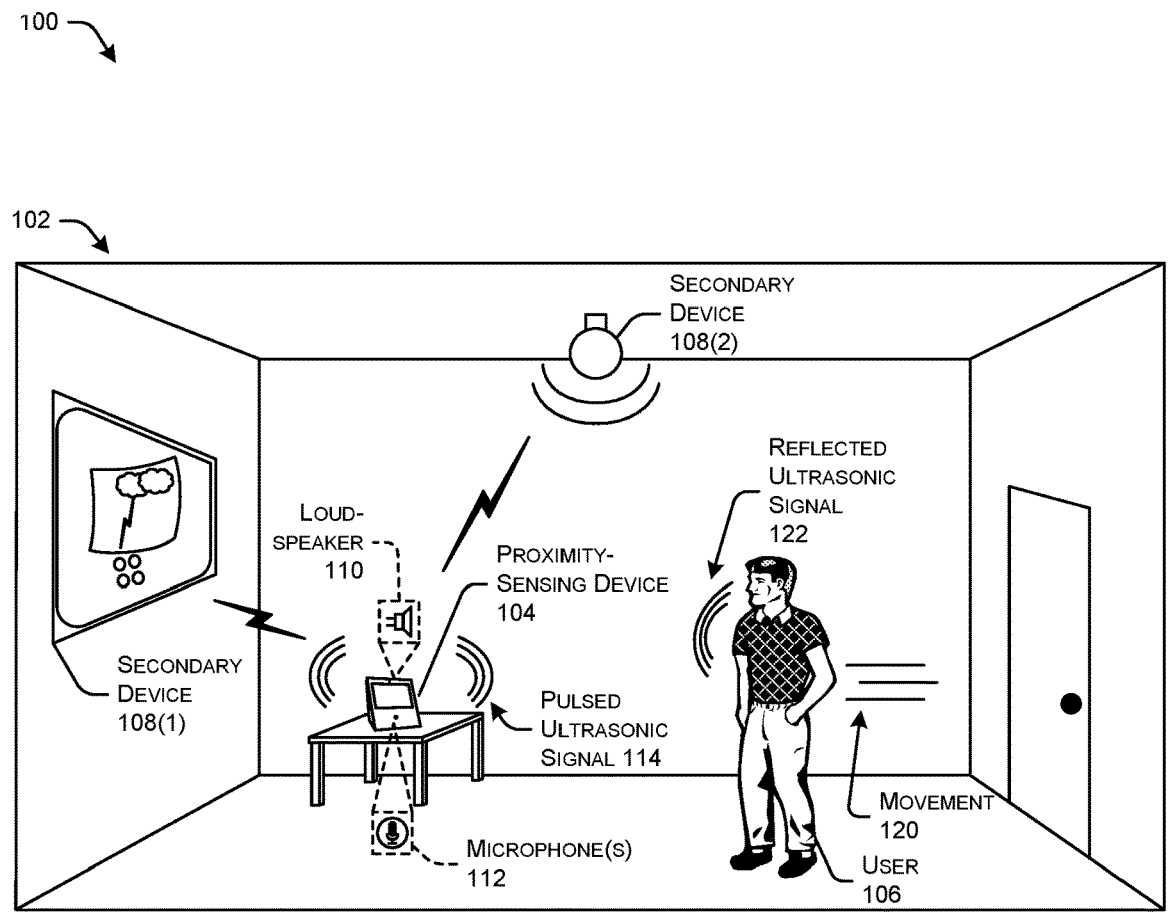
FIG. 1 shows an illustrative interactive architecture set in a home environment. The architecture includes a proximity-sensing device that emits pulsed ultrasonic signals to detect a proximity of a user, as well as a direction of movement of the user.
Figure 1:
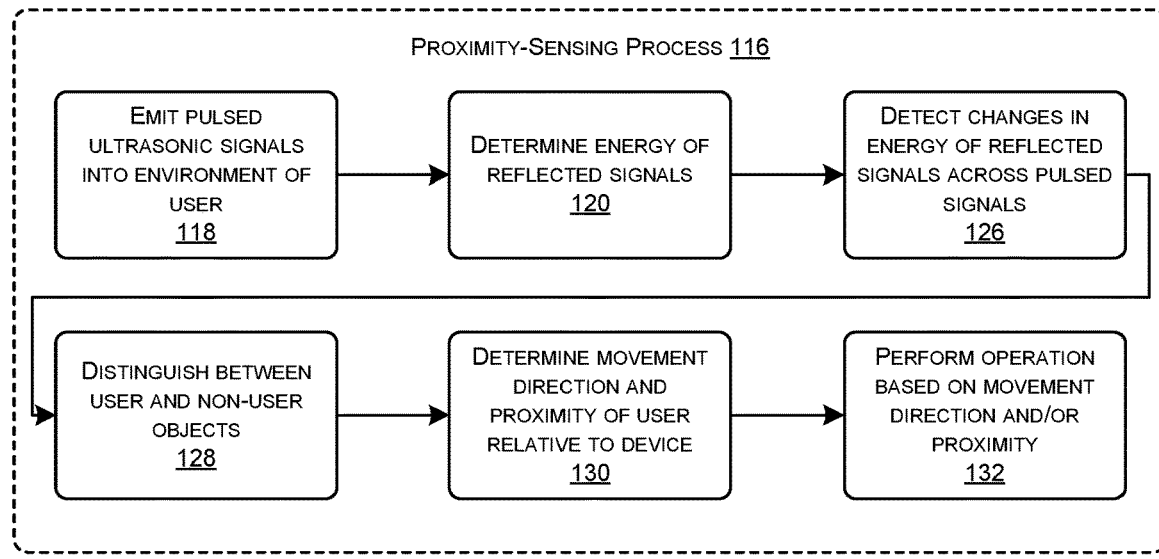

This disclosure describes, in part, proximity-sensing devices that detect movement of a person in an environment by emitting pulsed ultrasonic signals into the environment, and detecting a change in the energy measurements of the reflections of the pulsed ultrasonic signals off the person caused by the movement of the person relative to the proximity-sensing devices. In addition to detecting movement, and thus presence, of a person, the proximity-sensing devices may further perform techniques for identifying a direction of movement of the person, and also identifying a number of people that are in the room. Rather than designing or redesigning devices to include expensive, resource-intensive, specialized sensors for detecting motion, such as dedicated ultrasonic transducer, the proximity-sensing devices described herein may utilize an on-board loudspeaker to emit the ultrasonic signals. The use of pulsed ultrasonic signals, and monitoring changes in energy in reflections across the different signals emitted, not only enables movement detection and tracking, but also consumes less power and computing resources than continuous emission techniques.

In some examples, the proximity-sensing device may be installed or placed in an environment to monitor a location, such as a room of a house. For instance, the proximity-sensing device may be a display device that presents content to users, a light switch that is installed in a room, a voice-interface device moved into a room to interact with a user through voice, a security-system device to monitor a location, etc. The proximity-sensing device may periodically, or continuously, emit pulsed ultrasonic signals (e.g., frequencies above 20 kHz) into the room to determine if one or more users are moving in the room and a direction of movement, or depending on the use-case, whether the room is vacant. The proximity-sensing device may use the loudspeaker to emit pulsed ultrasonic signals at a determined duty cycle, and generate data representing reflection signals using the microphone. For example, the loudspeaker may emit pulsed ultrasonic signals, or short "bursts" of ultrasonic sound (e.g., 1 millisecond (ms), 5 ms, etc.), for an "on" portion of the duty cycle, and may then stop emitting ultrasonic sound, or greatly reduce the power at which ultrasonic sound is being emitted, for an "off" portion of the duty cycle (e.g., 25 ms, 50 ms, etc.). The proximity-sensing device may use a microphone to generate data representing reflections of the pulsed ultrasonic signals.

Generally, the data may represent energy of reflections of individual pulsed ultrasonic signals in respective "frames,"

or periods of time in which reflections from one of the pulsed ultrasonic signals are primarily or entirely represented in the data. The frames may be represented in the data in that an individual frame begins before, during, or right after a pulsed ultrasonic signal is emitted, continues during the "off" cycle when reflection signals are reflecting off objects and back towards the device, and end when a next pulsed ultrasonic signal is going to be emitted. In this way, a frame of the generated data represents reflection signals corresponding to one pulsed ultrasonic signal, and represent energy measurements for the reflection signals when received back at the device.

The proximity-sensing device may analyze the data on a frame-by-frame basis and determine amounts of energy for each frame representing energy measurements for each reflection signal. The energy measurements may represent the energy of a reflection signal, or a strength of the reflection signal, when that signal is received by the microphone of the proximity-sensing device. The data may represent the reflection signals as continuous-time signals that have a varying amplitude over time. Generally, the energy of a signal corresponds or is correlated to the total magnitude of the signal, and the proximity-sensing device may determine energy values for the reflected signals using various algorithms and the generated data as described below (in some instances, audio data). In addition to determining the energy values, the proximity-sensing device may identify and track the times at which the reflected signals were received back at the device and map those times to the respective energy values for that reflected signal. Thus, the proximity-sensing device determines the time-of-flight (ToF) values for reflected signals, and map those ToF values to the energy values for the reflected signals. The ToF is generally representative of distance with respect to sound signals or waves because the sound waves move at the speed of sound (e.g., 343 m/s), and ToF and speed of sound can be used to easily calculate distance.

The proximity-sensing device may then compare the energy measurements and ToF values for reflected signals across multiple frames, such as frames that represent two pulsed ultrasonic signals that were emitted in series with each other. Stated otherwise, the reflected signals that have the same, or similar, ToF and/or energy measurements in sequential frames are likely bouncing off the same objects because the difference in time across frames is on the order of milliseconds. Based on that comparison, the proximity-sensing device may determine which of the reflected signals had the largest change in energy across the frames. A change in energy indicates a change in the distance between the device and object off which the reflected signal is reflecting. Thus, the largest change in energy values across frames will correspond to the largest moving object in the environment, such as a user. In this way, the proximity-sensing device may determine that a user is moving in the environment.

The proximity-sensing device may use similar techniques as those described above to determine that multiple users are moving in the environment. For instance, the proximity-sensing device may determine that there are large amounts of changes in energy at a much different ToF than the first moving user, and thus a different user in the environment is moving as well. The proximity-sensing device can similarly determine the distance of the other user from the device, and also determine that the other user is in motion based on changes in energy measurements across frames.

Additionally, the proximity-sensing device may continue to track the movement of the user(s) in the environment. For instance, the proximity-sensing device may continue to emit pulsed ultrasonic signals, generate new frames of data, and determine new ToF values and energy measurement changes for the large, or dominant, objects in the environment (e.g., users). The proximity-sensing device can determine whether the ToF values are increasing, indicating that a user is moving away from the device, or decreasing which indicates that the user is moving towards the device.

The proximity-sensing device may perform various operations based on the determinations made herein, such as a proximity/distance of the user relative to the device, whether the user is moving towards or away from the device, and/or whether multiple users are in a room. For instance, the proximity-sensing device may cause various secondary devices to turn on or off (e.g., lights, television, security alarm, etc.), optimize the output of music data to create auditory "sweet spots" for the person as they move through the room, perform more effective beamforming techniques based on the location and/or movement of the user, and so forth. In one illustrative example, the proximity-sensing device may determine whether a user is within a threshold distance (e.g., 3 feet, 4 feet, etc.) to a proximity-sensing device that has a display. If the user is within the threshold distance, the proximity-sensing device may cause content to be presented on the display, or change a size of the content being displayed. For example, if a user moves within the threshold distance of the proximity-sensing device, the device may change the font size of text or size of images, change the brightness of content on the display, change what is presented on the display, start outputting content on the display (e.g., show the time or weather), and/or perform other operations.

In some examples, the techniques described herein may include various optimizations. For instance, when the proximity-sensing devices are playing music audio data, or otherwise outputting audio data in a human-audible frequency range, the proximity-sensing devices may be configured to determine how to mix the music audio data with the ultrasonic audio data in such a way that saturation is avoided. For instance, the proximity-sensing devices may analyze the music audio data stored in an audio buffer and determine locations at which to mix the audio data representing the ultrasonic signals in order to avoid saturation of the different audio data. Further details regarding this are described below.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 shows an illustrative interactive architecture 100 set in a home environment 102. The architecture includes a proximity-sensing device 104 that emits pulsed ultrasonic signals 114 to detect a proximity of a user 106, as well as a direction of movement of the user 106.

The architecture 100 includes at least one proximity-sensing device 104 controlling secondary devices 108 (e.g., television 108(1), light 108(2), or any other controllable device) physically situated in the home 102 based on detecting presence of the user 106. In this example, the proximity-sensing device 104 includes or comprises a display device that has a loudspeaker 110 and one or more microphones 112 to detect proximity, and/or direction of movement, of the user 106.

As shown in FIG. 1, the loudspeaker 110 of the proximity-sensing device 104 may transmit, or otherwise output, an emitted sound 114. Generally, the loudspeaker 110 may comprise any type of electroacoustic transducer that convers an electric audio signal into a corresponding sound. Generally, the loudspeaker 110 may be an existing on-board speaker configured to output sound within frequency ranges that are audible to humans, such as 35 Hz-20 kHz. However, in the illustrated example the emitted sound 114 may include at a pulsed emission of sound 114 at a frequency that is outside the frequency range in which humans can hear sound (e.g., over 20 kHz). Thus, the loudspeaker 110 may be emitting sound 114, such as ultrasonic signals, that may be traditionally out-of-band for the loudspeaker 110. As illustrated, FIG. 1 may represent a high-level proximity-sensing process 116 performed by the proximity-sensing device 104 in order to detect movement of an object, such as the user 106. At 118, the proximity-sensing device 104 may cause the loudspeaker 110 to emit the ultrasonic sound (e.g., emitted sound 114) into the home 102. In some examples, the proximity-sensing device 104 may emit pulsed ultrasonic signals 114 according to a duty cycle. For example, the loudspeaker 110 may emit pulsed ultrasonic signals 114, or short "bursts" of ultrasonic sound (e.g., 1 millisecond (ms), 5 ms, etc.), for an "on" portion of the duty cycle, and may then stop emitting ultrasonic sound 114, or greatly reduce the power at which ultrasonic sound 114 is being emitted, for an "off" portion of the duty cycle (e.g., 25 ms, 50 ms, etc.).

Upon being emitted, the sound 114 will generally reflect off of objects in the home 102. At 102, the proximity-sensing device 104 may use the microphone(s) 112 to generate audio data representing the reflected ultrasonic signal 122. Generally, the audio data (or other type of data, such as energy data) may represent reflections signals 122 of individual pulsed ultrasonic signals 114 in respective frames, or periods of time in which reflections 122 from one of the pulsed ultrasonic signals 114 are primarily or entirely represented in the audio data. The frames may be represented in data in that an individual frame begins before, during, or right after a pulsed ultrasonic signal 114 is emitted, continues during the "off" cycle when reflection signals 122 are reflecting off objects and back towards the device 104, and ends in the off cycle and before a next pulsed ultrasonic signal 114 is going to be emitted. In this way, a frame of the audio data represents reflection signals 122 corresponding to one pulsed ultrasonic signal 114, and represent energy measurements for the reflection signals 122 when received back at the device 104.

At 126, the proximity-sensing device 104 may detect changes in energy of reflected signals across frames representing the reflections 122 of the pulsed ultrasonic signals 114. For instance, the proximity-sensing device 104 may analyze the audio data on a frame-by-frame basis and determine energy data for each frame representing energy measurements for each reflection signal 122. The energy measurements may represent the energy of a reflection signal 122, such as a strength of the reflection signal 122, when that signal 122 is received by the microphone 112 of the proximity-sensing device 104. The audio data may represent the reflection signals 122 as continuous-time signals that have a varying amplitude over time. Generally, the energy of a signal corresponds or is correlated to the total magnitude of the signal, and the proximity-sensing device may determine energy values for the reflected signals using various algorithms and the audio data as described below. In addition to determining the energy values, the proximity-sensing device 104 may identify and track the times at which the reflected signals 122 were received back at the device 104 and map those times to the respective energy values for that reflected signal 122. Thus, the proximity-sensing device 104 determines the ToF values for reflected signals 122, and map those ToF values to the energy values for the reflected signals 122.

At 128, the proximity-sensing device 104 may distinguish between user and non-user objects 128. Generally, non-user objects include static objects in the environment (e.g., non-moving objects such as furniture, walls, etc.), as well as moving objects, but non-user objects (e.g., ceiling and floor fans, blinds or other items blowing in the wind from an open window, etc.). The proximity-sensing device 104 may determine that some objects are static in that the energy values for signals reflecting off those objects do not change across different frames. However, the proximity-sensing device 104 may further determine that there are objects moving in that energy values are changing across frames. The proximity-sensing device 104 may disambiguate between users 106 that are moving in the environment and objects that are moving, but are not user 106. For instance, the proximity-sensing device 104 may determine that objects that are moving in the environment are not changing position based on the ToF values for the reflected signals 122. That is, a ceiling fan or house plant blowing in the wind may have changes in energy values across frames, but the ToF values for those changes in energy values may not significantly change over time which indicates that the moving objects are staying in a same location, or substantially the same location, in the environment.

At 130, the proximity-sensing device 104 may determine a movement direction and proximity of the user 106 relative to the proximity-sensing device 104. For instance, the proximity-sensing device 104 may compare the energy measurements and ToF values for reflected signals 122 across multiple frames, such as frames that represent two pulsed ultrasonic signals 114 that were emitted in sequence with each other. Stated otherwise, the reflected signals 122 that have the same, or similar, ToF and/or energy measurements in sequential frames are likely bouncing off the same objects because the difference in time across frames is on the order of milliseconds. Based on that comparison, the proximity-sensing device 104 may determine which of the reflected signals 122 had the largest change in energy across the frames. A change in energy indicates a change in the distance between the device 104 and object off which the reflected signal 122 is reflecting. Thus, the largest change in energy values across frames will correspond to the largest moving object in the environment, such as the user 106. In this way, the proximity-sensing device 104 may determine that the user 106 is moving in the home 102.

Further, the proximity-sensing device 104 may continue to track the movement of the user 106 in the home 104. For instance, the proximity-sensing device 104 may continue to emit pulsed ultrasonic signals 114, generate new frames of audio data, and determine new ToF values and energy measurement changes for the user 106. The proximity-sensing device 104 can determine whether the ToF values are increasing, indicating that the user 104 is moving away from the device 104 (as is the case in this example), or decreasing which indicates that the user 106 is moving towards the device 104. As described in FIG. 2C, if the proximity-sensing device 104 has multiple microphones 112, the proximity-sensing device 104 may be able to determine a direction of movement of the user 106 relative to the device beyond simply determining that the user 106 is moving towards or away from the device 104.

At 132, the proximity-sensing device 104 may perform various operations based on the determinations made herein, such as a proximity/distance of the user 106 relative to the device, whether the user 106 is moving towards or away from the device 104, and/or whether multiple users are in a room. For instance, the proximity-sensing device 104 may cause various secondary devices 108 to turn on or off (e.g., lights, television, security alarm, etc.), optimize the output of music data to create auditory "sweet spots" for the user 106 as they move through the room 102, perform more effective beamforming techniques based on the location and/or movement of the user 106, and so forth. In one illustrative example, the proximity-sensing device 104 may determine whether the user 106 is within a threshold distance (e.g., 3 feet, 4 feet, etc.) to the proximity-sensing device 104 that has a display. If the user 106 is within the threshold distance, the proximity-sensing device 104 may cause content to be presented on the display, or change a size of the content being displayed. For example, if the user 106 moves within the threshold distance of the proximity-sensing device 104, the device 104 may change the font size of text or size of images, change the brightness of content on the display, change what is presented on the display, start outputting content on the display (e.g., show the time or weather), and/or perform other operations.

Figure 2A:
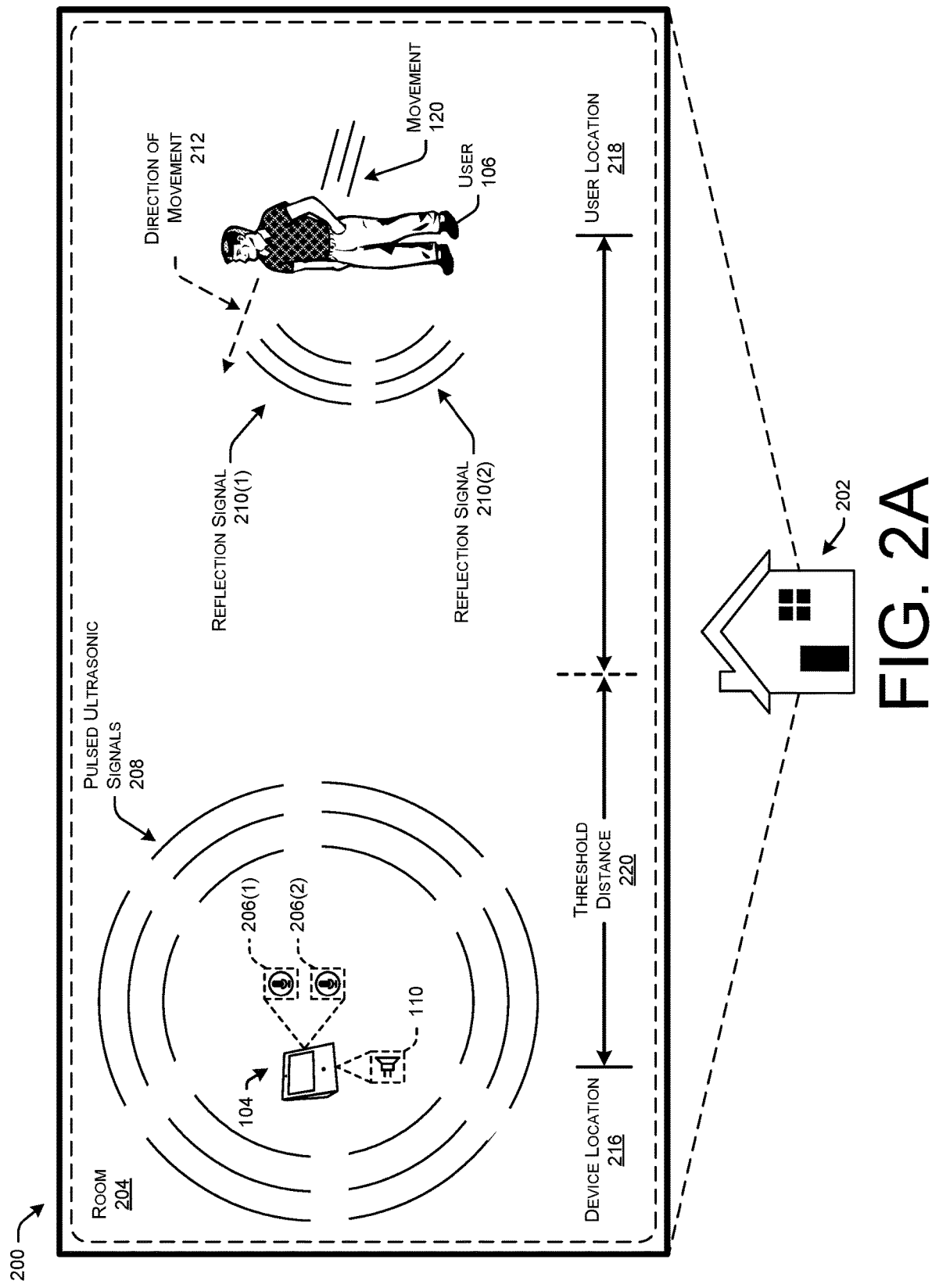
FIG. 2A illustrates an example environment in which a proximity-sensing device uses pulsed ultrasonic signals to detect a proximity of a user as well as a direction of movement of the user as the user moves through the environment.

FIG. 2A illustrates an example environment 200 in which a proximity-sensing device 104 uses pulsed ultrasonic signals 208 to detect a proximity of a user 106 as well as a direction of movement 212 of the user 106 as the user 106 moves through the environment 200.

As illustrated, the example environment 200 may include a monitored location, such as a home 202, that includes a room 204. The room may include a user 106 and a proximity-sensing device 104. The proximity-sensing device 104 may include a loudspeaker 110 and a microphone array 112 including a first microphone 206(1) and a second microphone 206(2). In some examples, the first microphone 206(1) and the second microphone 206(2) may be oriented in different directions, and/or perform beamforming in different directions. The loudspeaker 110 may transmit/emit pulsed ultrasonic signals 208 into the room 204 periodically, or continuously. The pulsed ultrasonic signals 208 may bounce off objects in the room 204, such as the user 106. In such examples, the pulsed ultrasonic signals 208 may bounce of the user 106 resulting in reflections of the ultrasonic signal 210.

The proximity-sensing device 104 may perform the techniques described above and analyze multiple frames of audio data representing reflections of different pulsed ultrasonic signals 208 to determine that the user 106 is in motion. Further, the proximity-sensing device 104 may determine a distance from a device location 216 and a user location 218 using the ToF values for the reflection signals that reflected off the user 106 and the speed of sound. The proximity-sensing device 104 may determine whether the user 106 is within a threshold distance 220 (e.g., 3 feet, 4 feet, etc.) to a proximity-sensing device 104. If the user 106 is within the threshold distance 220, and particularly for devices 104 that have a display, the proximity-sensing device 104 may perform various operations. For instance, the proximity-sensing device 104 may cause content to be presented on the display, change the font size of text or size of images, change the brightness of content on the display, change what is presented on the display, start outputting content on the display (e.g., show the time or weather), and/or perform other operations.

In examples where the proximity-sensing device 104 has multiple microphones 206(1) and 206(2), the proximity-sensing device 104 may be able to determine a location of the user 106 relative to the device 104. For instance, the proximity-sensing device 104 may know the locations of the microphones 206(1) and 206(2) relative to each other and the device 104 itself. Further, each of the microphones 206(1) and 206(2) may generate respective audio data (e.g., multi-channel) and those respective audio data streams may be used to determine the distance between the user location 218 and the respective microphone 206. The distances between the different microphones 206 and the user 106, as well as the locations of the microphones 206 on the device relative to each other, may be used to triangulate the position of the user 106 relative to the proximity-sensing device 104.

Figure 2B:
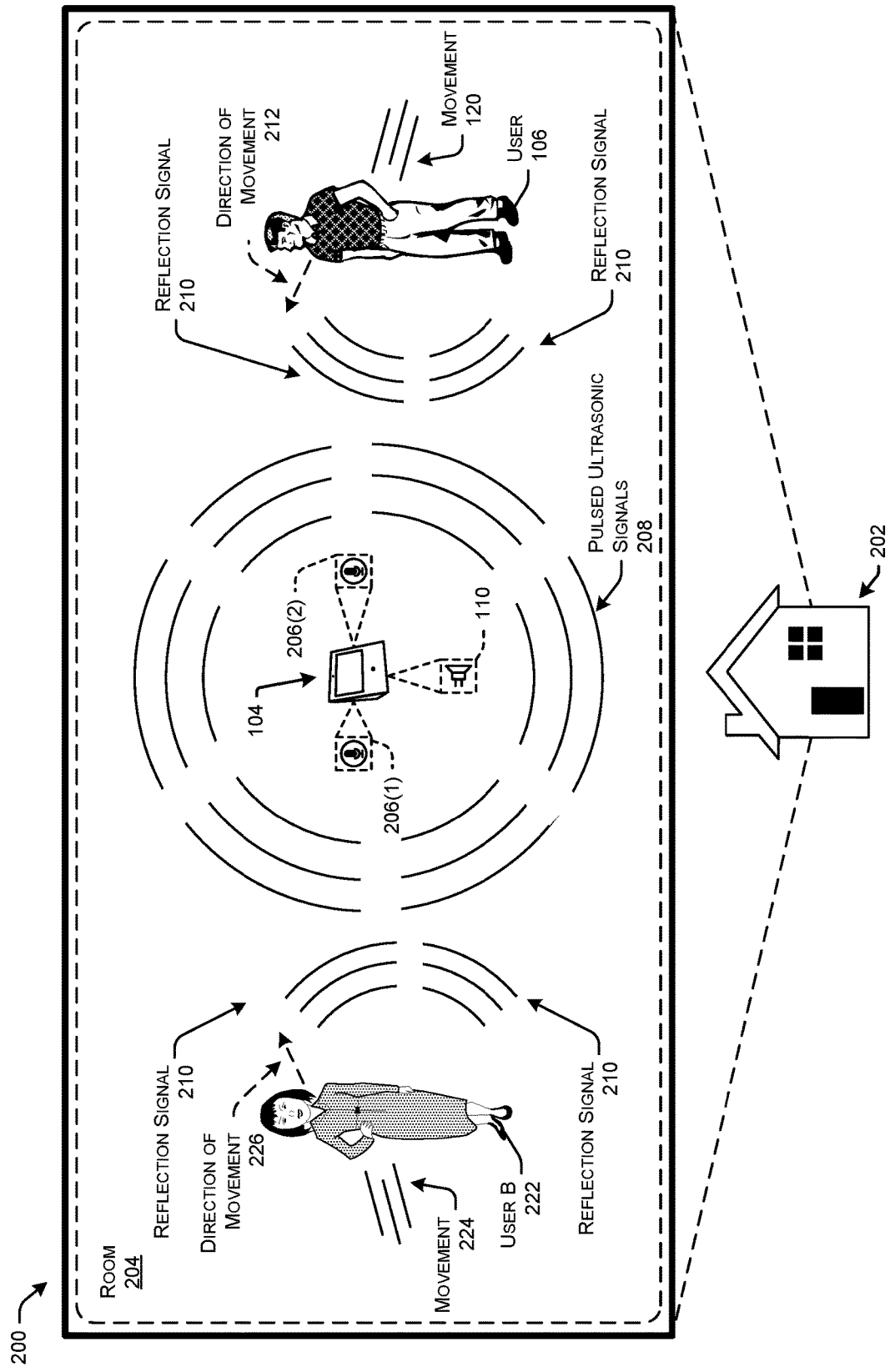
FIG. 2B illustrates another example environment in which a proximity-sensing device uses pulsed ultrasonic signals to detect the presence of multiple users, and also directions of movement for each of the users.

FIG. 2B illustrates another example environment 200 in which a proximity-sensing device 104 uses pulsed ultrasonic signals 208 to detect the presence of multiple users 106 and 222, and also directions of movement for each of the users. Similar to the techniques described in FIG. 2A, the proximity-sensing device 104 may, in FIG. 2B, utilize the loudspeaker 110 and one or more microphones 206 to detect the user 106 moving, and also a direction of movement 212.

In some examples, the proximity-sensing device 104 may cause the loudspeaker 110 to emit the pulsed ultrasonic signal 208 in the room 204. The pulsed ultrasonic signal 208 may reflect off objects in the room, such as the user 106, another user B 222, and/or off of other objects such as walls, furniture, etc. In various examples, the microphones 206(1) and 206(2) may each detect or receive reflections 210 of the pulsed ultrasonic signal 208 that originate or reflect off the users 106 and 214. The proximity-sensing device 104 may include components configured to determine that two or more users are in the room 204. For example, the proximity-sensing device 104 may analyze audio data that was generated using one or more of the microphones 206(1) and 206(2). Specifically, the proximity-sensing device 104 may analyze energy data determined using the audio data to determine if multiple users 106 and 214 are moving in the room 204. As an example, the proximity-sensing device 104 may analyze the energy data representing the reflections 210 to identify changes in energy measurements for reflections across frames. The proximity-sensing device 104 may use similar techniques as those described above to determine that multiple users 106/222 are moving in the environment 200. For instance, the proximity-sensing device 104 may determine that there are large amounts of changes in energy at a much different ToF than the first moving user 106, and thus a different user B 222 in the environment 200 is moving as well. The proximity-sensing device 104 can similarly determine the distance of the other user B 222 from the proximity-sensing device 104, and also determine that the other user B 222 is in motion based on changes in energy measurements across frames.

Figure 2C:
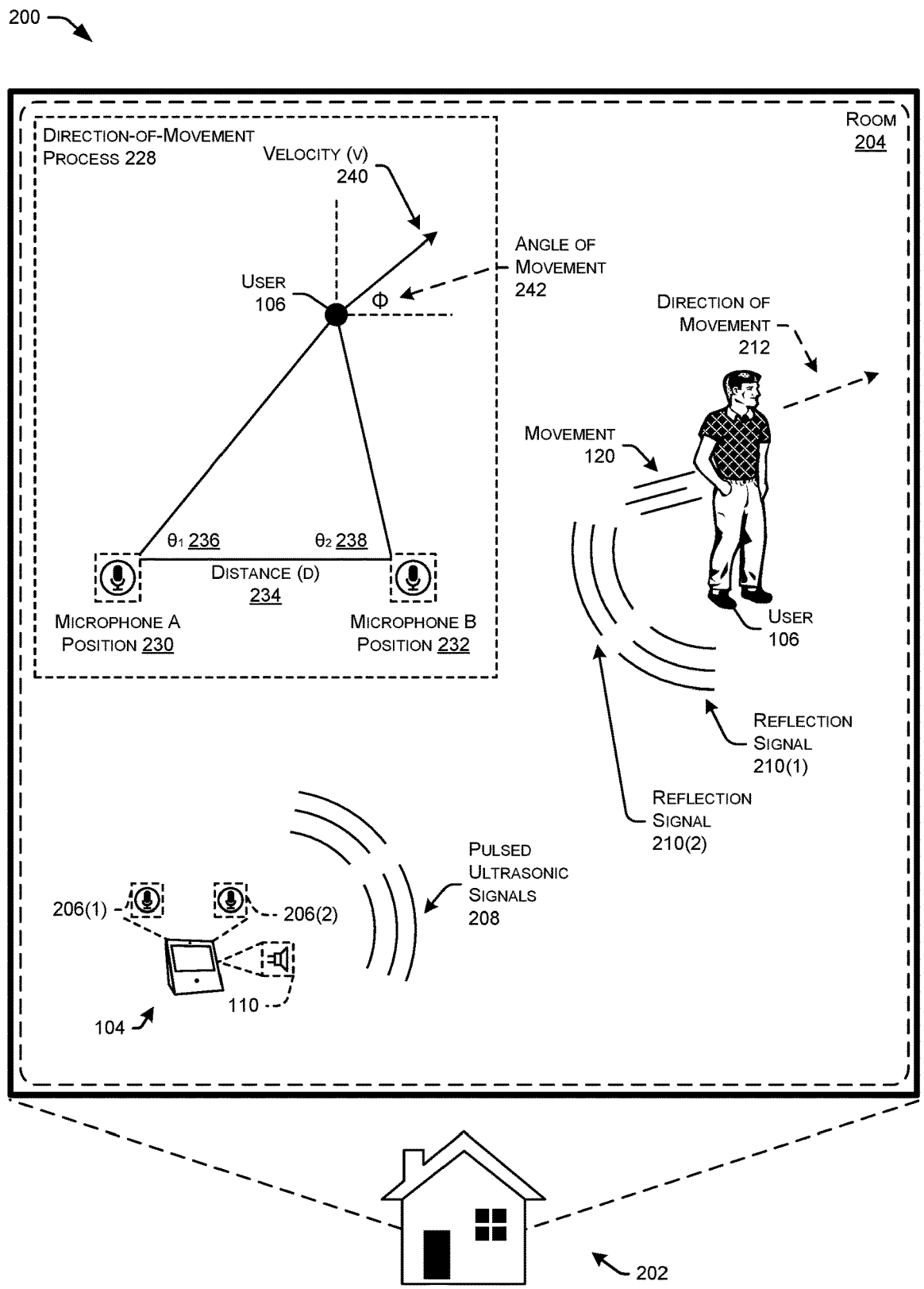
FIG. 2C illustrates another example environment in which a proximity-sensing device uses multiple microphones to determine a direction of movement for a user.

FIG. 2C illustrates another example environment in which a proximity-sensing device 104 uses multiple microphones 206 to determine a direction of movement for a user 106.

Similar to the techniques described in FIGS. 1 and 2A, the proximity-sensing device 104 may, in FIG. 2C, utilize the loudspeaker 110 and multiple microphones 206 to detect the user 106 moving. The proximity-sensing device 104 may use multiple microphones 206(1) and 206(2) (and/or potentially additional microphones 206) along with the loudspeaker 110 to perform a direction-of-movement process 228. The loudspeaker 110 may continue to emit pulsed ultrasonic signals 208 as described herein, the proximity-sensing device 104 may use each of the microphones 206 to determine distances between the user 106 and each of the microphones 206. The microphones 206 may be located on the device 104 at position 230 and 232, respectively. The positions 230 and 232 of the microphones 206 on the proximity-sensing device 104 may be a predefined distance (d) 234 apart, and this results in the distances between the user 106 and the microphones 206 being different. The proximity-sensing device 104 may track distances between the user 106 and the microphones 206 using different frames representing the pulsed ultrasonic signals 208.

Thus, the distance 234 between the microphone positions 230 and 232 and known, and the distances between each of the microphone 206 positions and the user 106 is being tracked over time, then the angles $\theta_1$ 236 and $\theta_2$ 238 can be calculated using various known and basic trigonometric functions (e.g., cosine, tangent, sine, etc.). However, the velocity (v) 240 and angle of movement 242 ($\Phi$) are unknown. To compute this, the following equations may be used:

$$v \cos(\theta_1 - \Phi) = \left(\frac{ds_1}{dt}\right) \quad \text{Equation 1}$$

$$v \cos(\pi - \theta_2 - \Phi) = \left(\frac{ds_2}{dt}\right) \quad \text{Equation 2}$$

Equation 1 shown above represents the speed at which the distance between the user 106 and microphone A position 230 is changing, and equation 2 represents the speed at which the distance between the user 106 and microphone B position 232 is changing. Thus, there are two equations, Equation 1 and Equation 2, and two unknowns of velocity (v) 240 and angle of movement ($\Phi$) 242. Using these two equations, the unknown values of velocity (v) 240 and angle of movement ($\Phi$) 242 can be computed to determine the velocity 240 of the user 106 as well as the angle of movement ($\Phi$) 242 relative to the device 104. The proximity-sensing device 104 may continue to determine the velocity 240 of the user 106 as well as the angle of movement 242 as new frames of data come in to update the values for these variables, and to track the speed and direction of movement 212 of the user 106 over time.

Figure 3:
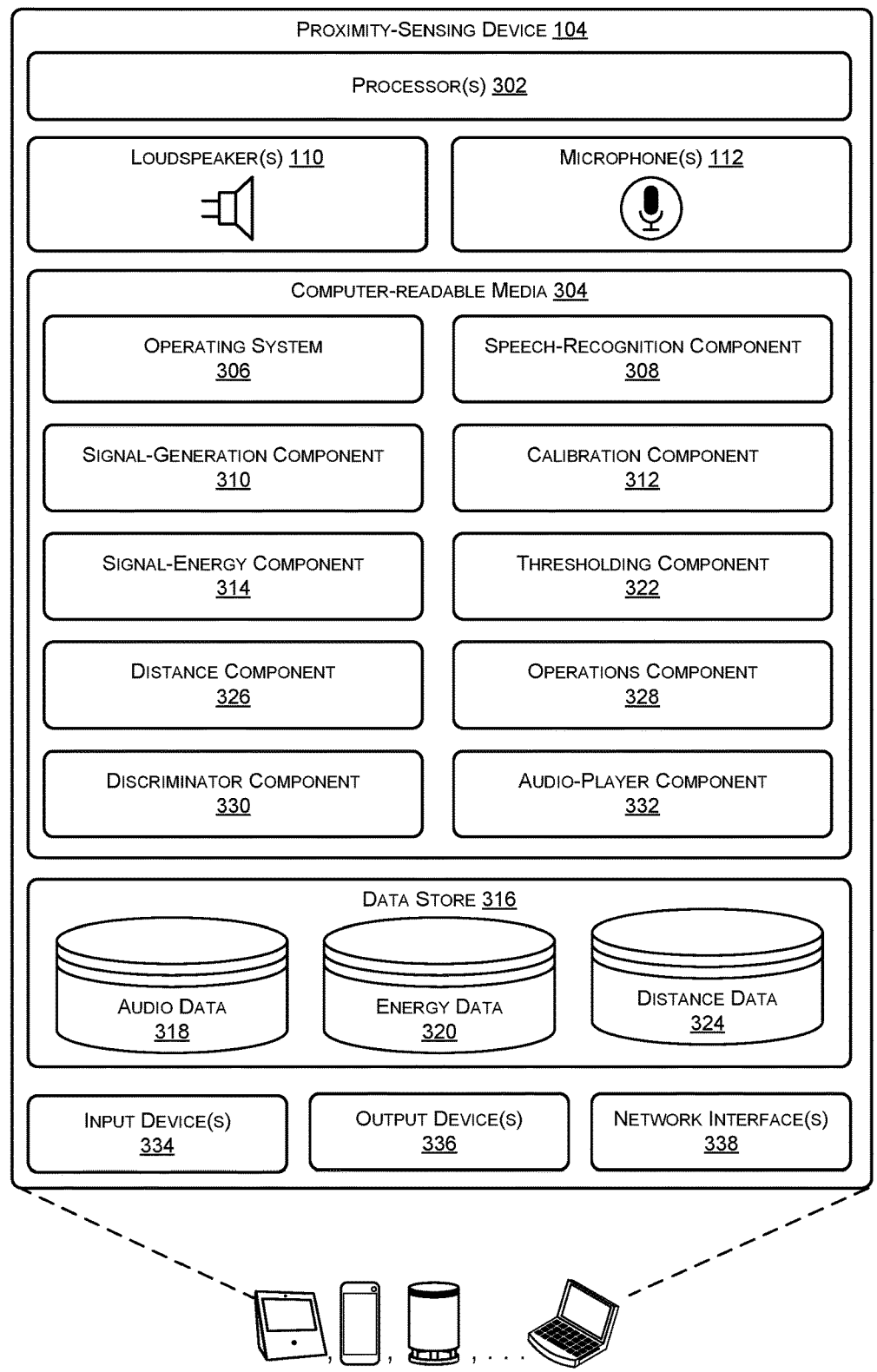
FIG. 3 illustrates an example component diagram of a proximity-sensing device.

FIG. 3 illustrates an example component diagram 300 of a proximity-sensing device 104. Generally, the proximity-sensing device 104 may comprise any type of device, such as a fixed computing device (e.g., light switch, appliance, etc.), a display device (e.g., television, screen interface device, etc.) and/or a portable or mobile device such as voice-controlled devices, smartphones, tablet computers, media players, personal computers, wearable devices, various types of accessories, and so forth.

The proximity-sensing device 104 may include one or more processors 302 configured to execute various computer-executable instructions stored on the proximity-sensing device 104. Further, the proximity-sensing device 104 may include one or more loudspeakers 110 positioned at one or more locations on the proximity-sensing device 104. The loudspeakers 110 may include one loudspeaker 110, and/or an array of loudspeakers configured to coordinate the output of sound. The loudspeakers 110 may comprise any type of electroacoustic transducer which converts an electronic audio signal (e.g., audio data) into corresponding sound represented by the audio signal. In some examples, the loudspeaker(s) 110 may be simple onboard speakers designed to output sound in frequency ranges that are audible to humans, rather than being specialized ultrasonic transducers. However, in other examples the loudspeaker(s) 110 may be specialized ultrasonic transducers depending on the proximity-sensing device 104.

The proximity-sensing device 104 may further include the microphone array 112 that comprises one or more microphones which may include transducers that convert sound into an electrical audio signal. The microphone array 112 may include any number of microphones that are arranged in any pattern. For example, the microphone array 112 may be arranged in a geometric pattern, such as a linear geometric form, circular geometric form, or any other configuration. As an example, an array of four microphones may be placed in a circular pattern at 90-degree increments (e.g., 0, 90, 180, 270) to receive sound from four directions. The microphone array 112 may be in a planar configuration, or positioned apart in a non-planar three-dimensional region. In some implementations, the microphone array 112 may include a spatially disparate array of sensors in data communication. For example, a networked array of sensors may be included. The microphone array 112 may include omni-directional microphones, directional microphones (e.g., shotgun microphones), and so on.

The proximity-sensing device 104 may further include computer-readable media 304 that may be used to store any number of software and/or hardware components that are executable by the processor(s) 302. Software components stored in the computer-readable media 304 may include an operating system 306 that is configured to manage hardware and services within and coupled to the proximity-sensing device 104. The computer-readable media may store a speech-recognition component 308 that, when executed by the processor(s) 302, perform speech-recognition on processed audio signal(s) to identify one or more voice commands represented therein. For instance, the speech-recognition component 308 may convert the audio signals into text data using automatic-speech recognition (ASR), and determine an intent for voice commands of the user 106 using natural-language understanding (NLU) on the text data. Thereafter, a command processor, stored in the computer-readable media 304 (and/or at a remote network-based system), may cause performance of one or more action in response to identifying an intent of the voice command. In the illustrated example, for instance, the command processor may issue an instruction to control a secondary device 108. For instance, the command processor may issue one or more instructions to the television 108(1) to show the weather channel, sends an instruction to dim the light 108(2), and/or output music using a loudspeaker 110.

The computer-readable media 304 may further store a signal-generation component 310 that, when executed by the processor(s) 302 generate audio signals/data that represent sound to be output by the loudspeaker(s) 110. The signal-generation component 310 may, for example, generate audio data representing ultrasonic signals that are output by the loudspeaker(s) 110 at a frequency that is above the audible range of humans. The signal-generation component 310 may generate ultrasonic signals at various power levels depending on, for example, a size of a room that the proximity-sensing device 104 is in. Further, the signal-generation component 310 may generate ultrasonic signals that are converted into sound by the loudspeaker(s) 110 according to various timing implementations, such as a pulsed sound, a periodically pulsed sound, etc. The signal-generation component 310 may generate pulsed ultrasonic signals 114 according to various waveforms, such as various duty cycles of on or off.

The computer-readable media 304 may further store a calibration component 312 configured to, when executed by the processor(s) 302, determine audio characteristics of an environment of the proximity-sensing device 104 and/or frequencies at which to output sound by the loudspeaker(s) 110. In some examples, the calibration component 312 may cause the signal-generation component 310 to generate audio data representing a calibration tone, such as an ultrasonic sweep signal, to determine audio characteristics of the environment of the proximity-sensing device 104. The calibration component 312 may perform device calibration to determine an optimal frequency range for ultrasonic signals to be emitted by the loudspeaker(s) 110 into the environment. In some examples, the calibration component 312 may cause the signal-generation component 310 to generate an ultrasonic sweep signal that, when converted into sound by the loudspeaker(s) 110, emits a sound over a period of time at a range of ultrasonic frequencies (e.g., 27 kHz-33k Hz). The calibration component 312 may also activate at least one microphone in the microphone array 112 to generate audio data representing the ultrasonic sweep signal, and determine an optimal frequency range/bin for the environment. For instance, the calibration component 312 may analyze various frequency ranges included in the total frequency range of the ultrasonic sweep signal and determine signal-to-noise (SNR) values for one or more frequency ranges. The calibration component 312 may determine which sub-frequency range in the total frequency range of the ultrasonic sweep signal has the best SNR value. In some examples, the calibration component 312 may utilize the ultrasonic sweep signal upon installation of the proximity-sensing device 104, after detecting movement, or the end of movement, using a sensor of the proximity-sensing device 104, and/or periodically in order to determine an optimal frequency at which to emit ultrasonic signals into an environment of the proximity-sensing device 104.

The computer-readable media 304 may further include a signal-energy component 314 that, when executed by the processor(s) 302, perform various operations for processing audio data 318 to determine energy data 320 that represents energy measurements for reflections 122 of the pulsed ultrasonic signals 114. The audio data 318 may represent the reflection signals 122 as continuous-time signals that have a varying amplitude over time. Generally, the energy of a signal corresponds or is correlated to the total magnitude of the signal, and the proximity-sensing device may determine energy values for the reflected signals using various algorithms and the audio data as described below. In one example, to determine the energy data using the audio data, the proximity-sensing device may determine the root-mean-square energy (RMSE) values for the signals. The RMSE values may be placed or grouped into "bins" that represent energy measurements for reflections 122 receives over time. In another example, the signal-energy component 314 may use a Hilbert transform, or another transform that determines higher-order differences in the frames to compute the energy of fluctuations.

The computer-readable media 304 may further include a thresholding component 322 that, when executed by the processor(s) 302, perform various operations for signals that represent targets that are static or stationary, or "noise" signals. For instance, the thresholding component 322 may apply a threshold to remove a portion of the unwanted energy data 320, such as 90% of the unwanted energy data 320 being removed. In this way, the thresholding component 322 may isolate the energy data 320 that represents the largest changes in energy measurements between frames.

The computer-readable media 304 may further include a distance component 322 that, when executed by the processor(s) 302, perform various operations for determining the distance between the proximity-sensing device 104 and a user 106. For instance, the distance component 322 may use ToF values (or roundtrip time) based on when the pulsed ultrasonic signals 114 are emitted and when the reflected ultrasonic signals 122 are received. The ToF values are generally representative of distance with respect to sound signals or waves because the sound waves move at the speed of sound (e.g., 343 m/s), and ToF and speed of sound can be used to easily calculate distance. Thus, the distance component 322 may use Equation 1, shown below, to determine distances between the proximity-sensing device 104 and the user 106, wherein "d" is the distance between the user 106 and the proximity-sensing device 104, "c" is the speed of sound, and "t" is the ToF of the signal:

$$d = c\left(\frac{t}{2}\right) \qquad \text{Equation 3}$$

Thus, using these ToF values, the distance component 326 may determine distances for reflected signals in different frames that have been reflected off a moving user 106. The distance component 326 may store the distances in the distance data 324 of the data store 316. Using different distances tracked over various frames and period of time, the distance component 326 can determine a movement direction of the user 106 (e.g., towards the device, away from the device, substantially parallel with the device, around the device, etc.). Further, the distance component 316 may determine whether the user 106 is within a threshold proximity or distance to the proximity-sensing device 104.

The computer-readable media 304 may further include an operations component that, when executed by the processor(s) 302, perform various operations based on the determinations made herein, such as a proximity/distance of the user 106 relative to the device 104, whether the user 106 is moving towards or away from the device 104, and/or whether multiple users 106 are in a room. For instance, the proximity-sensing device 104 may cause various secondary devices to turn on or off (e.g., lights, television, security alarm, etc.), optimize the output of music data to create auditory "sweet spots" for the person 106 as they move through the room, perform more effective beamforming techniques based on the location and/or movement of the user 106, and so forth. In one illustrative example, the proximity-sensing device 104 may determine whether a user is within a threshold distance (e.g., 3 feet, 4 feet, etc.) to a proximity-sensing device 104 that has a display. If the user 106 is within the threshold distance, the proximity-sensing device 104 may cause content to be presented on the display, or change a size of the content being displayed. For example, if a user 106 moves within the threshold distance of the proximity-sensing device 104, the device 104 may change the font size of text or size of images, change the brightness of content on the display, change what is presented on the display, start outputting content on the display (e.g., show the time or weather), and/or perform other operations.

The computer-readable media 304 may further store a discriminator component 330 configured to distinguish between user and non-user objects 128. Generally, non-user objects include static objects in the environment (e.g., non-moving objects such as furniture, walls, etc.), as well as moving objects, but non-user objects (e.g., ceiling and floor fans, blinds or other items blowing in the wind from an open window, etc.). The discriminator component 330 may determine that some objects are static in that the energy values for signals reflecting off those objects do not change across different frames. However, the discriminator component 330 may further determine that there are objects moving in that energy values are changing across frames. The discriminator component 330 may disambiguate between users 106 that are moving in the environment and objects that are moving, but are not user 106. For instance, the discriminator component 330 may determine that objects that are moving in the environment are not changing position based on the ToF values for the reflected signals 122. That is, a ceiling fan or house plant blowing in the wind may have changes in energy values across frames, but the ToF values for those changes in energy values may not significantly change over time which indicates that the moving objects are staying in the same location, or substantially the same location, in the environment.

The computer-readable media 304 may further store an audio-player component 332 configured to, when executed by the processor(s) 302, cause the processor(s) 302 to play audio such as music songs or other audio files. The audio-player component 332 may cause audio data to be provided to the loudspeaker(s) 110 to be converted into sound. In some examples, prior to providing the audio data to the loudspeaker(s) 110, the audio data may be stored in an audio-data buffer. In such examples, the signal-generation component 310 (or another component) may analyze the audio data stored in the audio-data buffer and determine how to mix the audio data, such as music data, with audio data representing the ultrasonic signal such that the output sound does not experience saturation.

The proximity-sensing device 104 may comprise any type of portable and/or fixed device and include one or more input devices 334 and output devices 336. The input devices 334 may include a keyboard, keypad, lights, mouse, touch screen, joystick, control buttons, etc. The output devices 336 may include a display, a light element (e.g., LED), a vibrator to create haptic sensations, or the like. In some implementations, one or more loudspeakers 110 may function as output devices 336 to output audio sounds.

The proximity-sensing device 104 may have one or more network interfaces 338 such as a wireless or Wi-Fi network communications interface, an Ethernet communications interface, a cellular network communications interface, a Bluetooth communications interface, etc., for communications over various types of networks, including wide-area network, local-area networks, private networks, public networks etc. In the case of a wireless communications interfaces, such interfaces may include radio transceivers and associated control circuits and logic for implementing appropriate communication protocols.

The network interface(s) 338 may enable communications between the proximity-sensing device 104 and the secondary devices 108, as well as other networked devices. Such network interface(s) can include one or more network interface controllers (NICs) or other types of transceiver devices to send and receive communications over a network.

For instance, the network interface(s) 338 may include a personal area network (PAN) component to enable communications over one or more short-range wireless communication channels. For instance, the PAN component may enable communications compliant with at least one of the following standards IEEE 802.15.4 (ZigBee), IEEE 802.15.1 (Bluetooth), IEEE 802.11 (WiFi), or any other PAN communication protocol. Furthermore, each of the network interface(s) 338 may include a wide area network (WAN) component to enable communication over a wide area network. The networks may represent an array of wired networks, wireless networks, such as WiFi, or combinations thereof.

Figure 4:
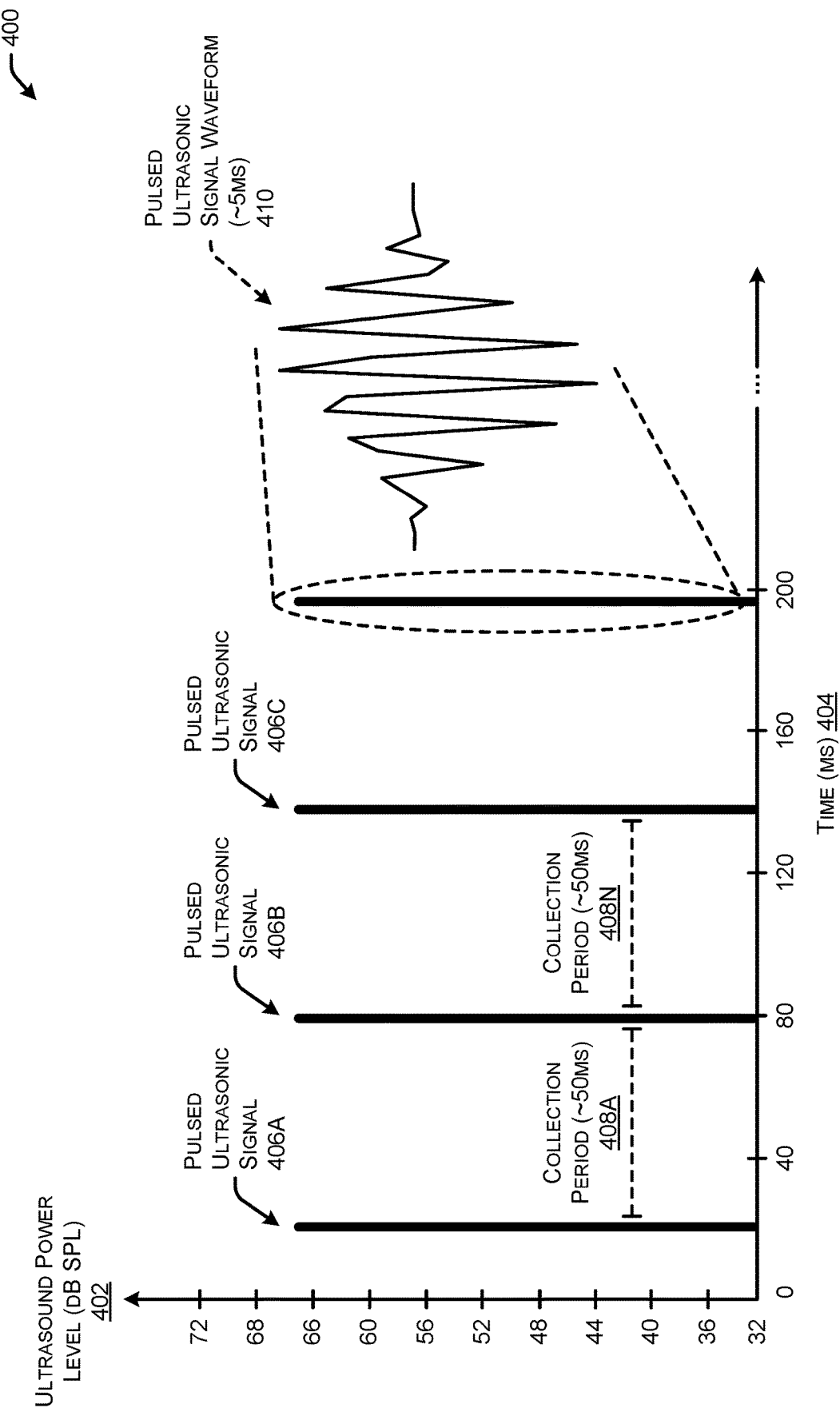
FIG. 4 illustrates an example diagram depicting emissions of pulsed ultrasonic signals over time, and an example signal waveform of a pulsed ultrasonic signal.

FIG. 4 illustrates an example diagram 400 depicting emissions of pulsed ultrasonic signals 114 over time, and an example signal waveform of a pulsed ultrasonic signal 406.

The diagram includes a chart where pulsed ultrasonic signals 406 are plotted with respect to ultrasound power level 402 (in decibels (dB) sound pressure level (SPL)) and time 404 in milliseconds. As shown, the pulsed ultrasonic signals 406 may be emitted periodically, or according to a duty cycle, and for a duration of approximately 5 ms (other durations may be used). The "off" cycle, or collection period 408 during which reflection signals 122 are collected, may be approximately 50 ms (other durations may be used). In this way, the audio data generated that represents frames including at least the collection period 408 may represent the reflected ultrasonic signals 122 without interference from the pulsed ultrasonic signal 406 (e.g., direct path interference).

FIG. 4 further illustrates a pulsed ultrasonic signal waveform 410. This is just a sample of what a pulse may look like according to the techniques described herein, and may be emitted in a burst of approximately 5 ms. The pulsed ultrasonic signal waveform 410 is one example of a waveform that could be used, but any waveform could be used for the pulsed ultrasonic signals 406 and the pulse waveform 410 is configurable, such as Gaussian window pulses, Hanning window pulses, and/or any other type of pulse waveform.

Figure 5A:
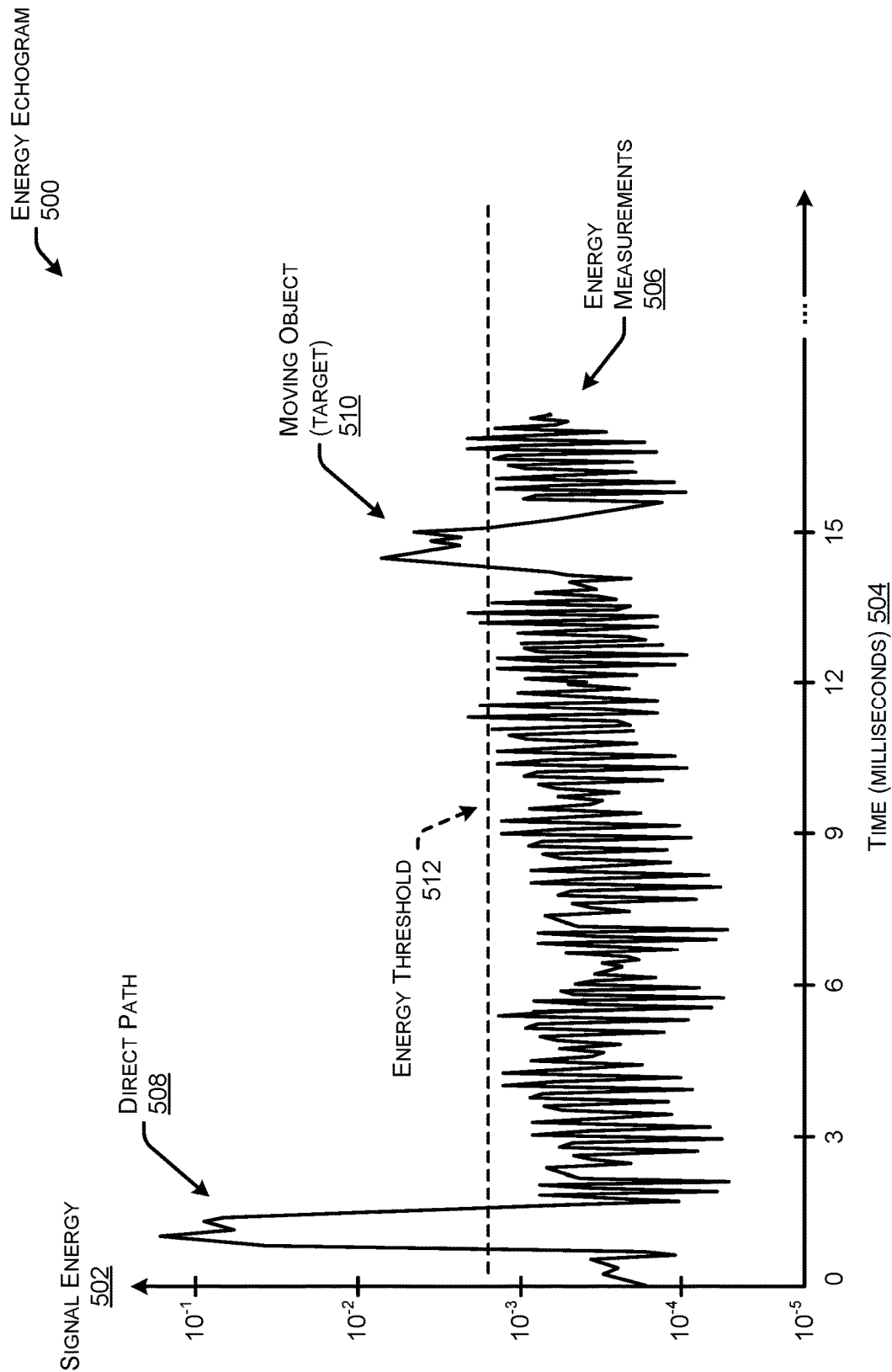
FIG. 5A illustrates an example energy echogram that illustrates energy measurements of reflection signals correspond to reflections of pulsed ultrasonic signals that reflected off a moving object in an environment.

FIG. 5A illustrates an example energy echogram 500 that illustrates energy measurements of reflection signals 122 correspond to reflections of pulsed ultrasonic signals 114 that reflected off a moving object in an environment.

The energy echogram 500 illustrates energy measurements 506 are plotted with respect to signal energy 502 and time 504 in milliseconds. As shown, the energy measurements 506 may indicate a representation of the direct path energy 508, as well as a moving object 510 energy. Further, the echogram 500 indicates an energy threshold 512 that is used to remove unwanted energy changes from further processing.

Figure 5B:
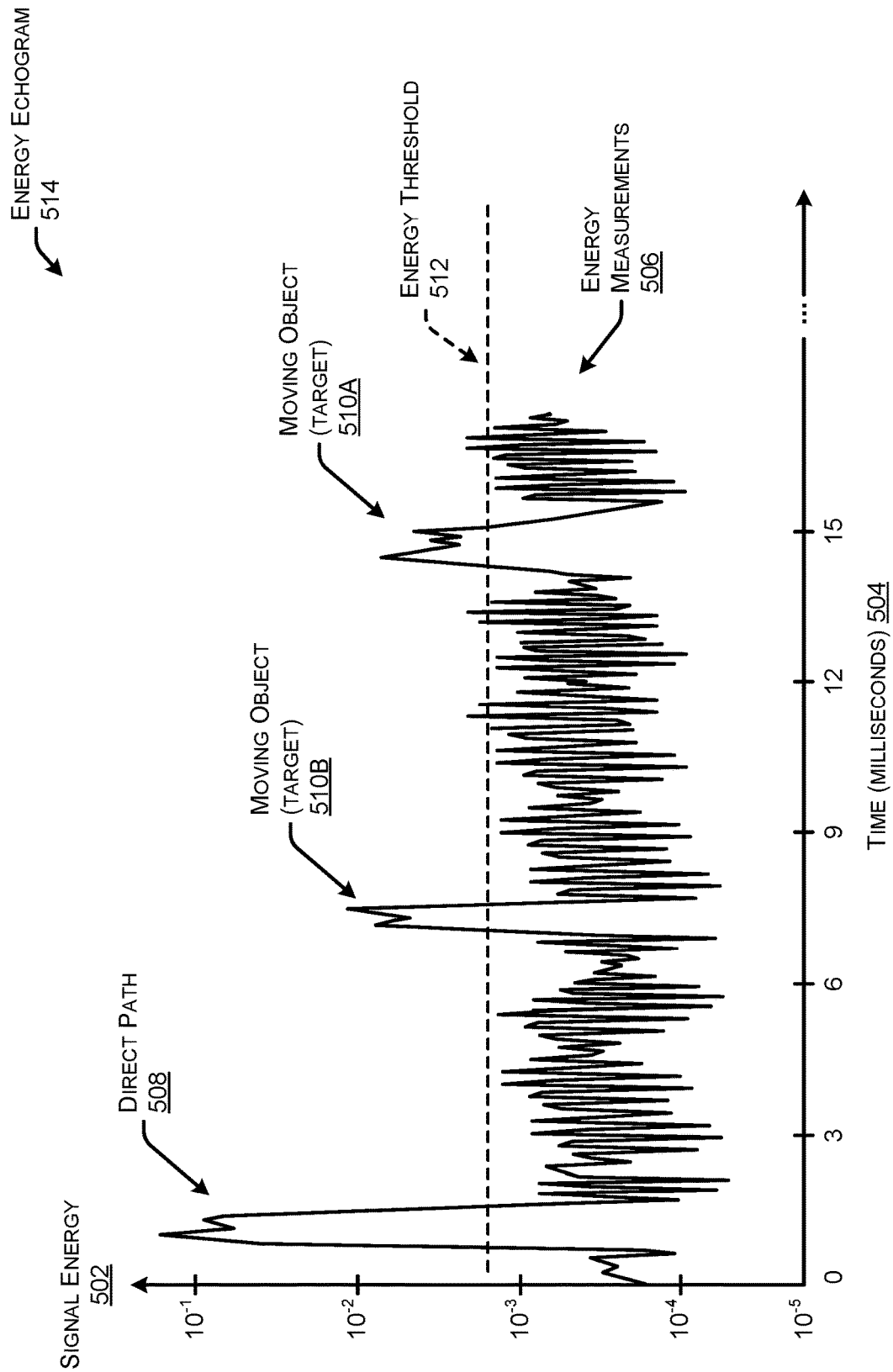
FIG. 5B illustrates an example energy echogram that illustrates energy measurements of reflection signals correspond to reflections of pulsed ultrasonic signals that reflected off multiple moving objects in an environment.

FIG. 5B illustrates an example energy echogram 514 that illustrates energy measurements 506 of reflection signals 122 correspond to reflections of pulsed ultrasonic signals 114 that reflected off multiple moving objects in an environment.

The energy echogram 514 illustrates energy measurements 506 are plotted with respect to signal energy 502 and time 504 in milliseconds. As shown, the energy measurements 506 may indicate a representation of the direct path energy 508, as well as a first moving object 510A energy as well as a second moving object energy 510B that is at a different ToF value. Further, the echogram 514 indicates the energy threshold 512 that is used to remove unwanted energy changes from further processing.

Figure 6:
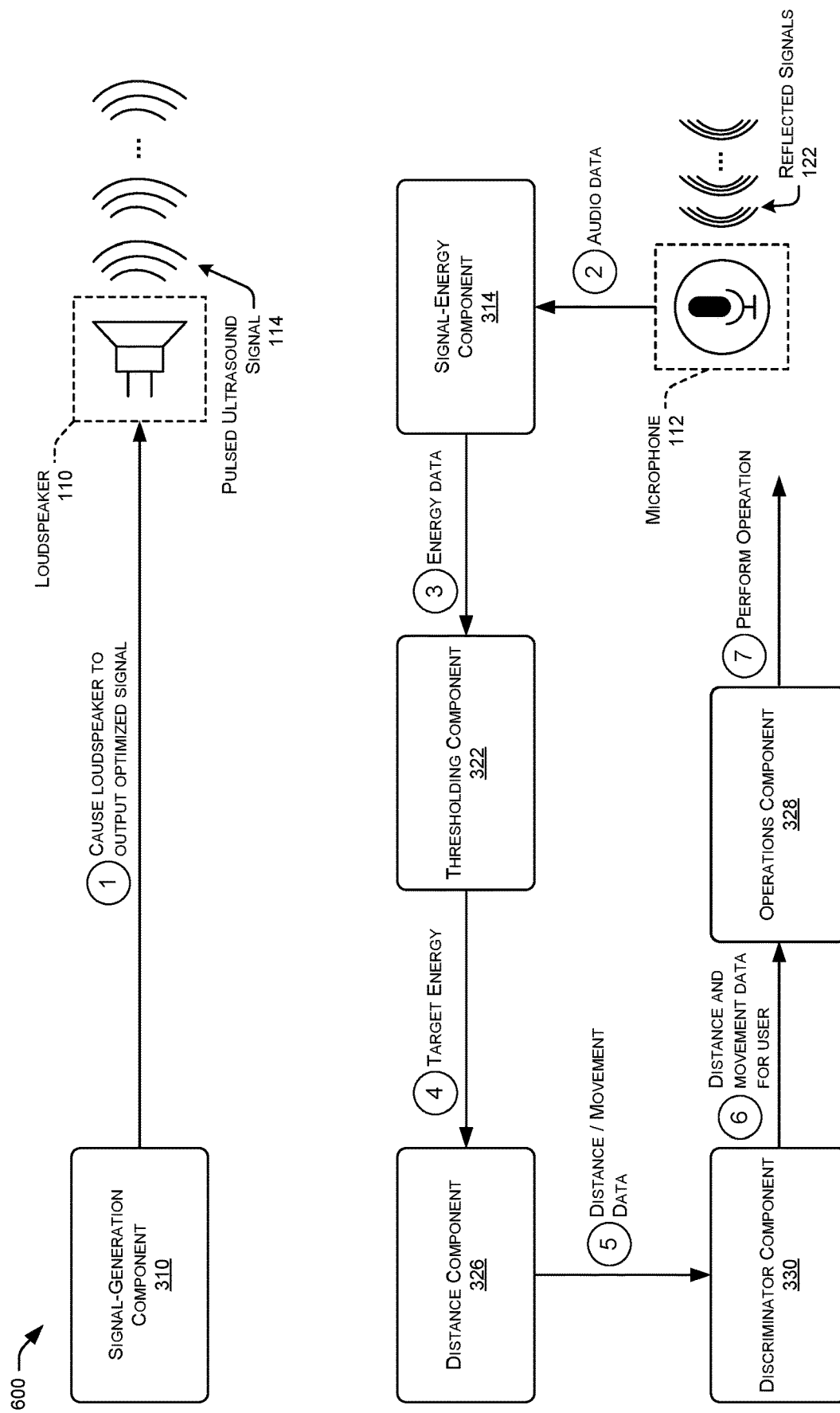
FIG. 6 illustrates an example high-level process for generating and emitting pulsed ultrasonic signals into an environment, and analyzing audio data representing reflections of the ultrasonic signal off objects in the environment to detect proximity and/or direction of movement of a user.

FIG. 6 illustrates an example high-level process 600 for generating and emitting pulsed ultrasonic signals 114 into an environment, and analyzing audio data 318 representing reflections of the ultrasonic signal off objects in the environment to detect proximity and/or direction of movement of a user 106.

At "1," the proximity-sensing device may use the loudspeaker to periodically, or continuously, emit pulsed ultrasonic signals 114 (e.g., frequencies above 20 kHz) into the room to determine if one or more users 106 are moving in the room and a direction of movement. The proximity-sensing device may use the loudspeaker to emit pulsed ultrasonic signals at a determined duty cycle. For example, the loudspeaker may emit pulsed ultrasonic signals, or short "bursts" of ultrasonic sound (e.g., 1 millisecond (ms), 5 ms, etc.), for an "on" portion of the duty cycle, and may then stop emitting ultrasonic sound, or greatly reduce the power at which ultrasonic sound is being emitted, for an "off" portion of the duty cycle (e.g., 25 ms, 50 ms, etc.).

At "2," the microphone 112 may receive reflected signals 122 and generate audio data 318 representing reflection signals 122 using the microphone 112. Generally, the audio data 318 may represent reflections of individual pulsed ultrasonic signals in respective "frames," or periods of time in which reflections from one of the pulsed ultrasonic signals are primarily or entirely represented in the audio data.

At "3," the signal-energy component 314 may analyze the audio data 318 on a frame-by-frame basis and determine energy data 320 for each frame representing energy measurements for each reflection signal 122. The energy measurements may represent the energy of a reflection signal when that signal is received by the microphone of the proximity-sensing device.

At "4," the thresholding component 322 may remove reflected signals 122 that have respective energy measurements or changes in energy that are below a threshold (e.g., remove 90%, 80%, etc. of signals).

At "5", the distance component 326 may receive or identify the ToF values for reflected signals 122, and map those ToF values to the energy values for the reflected signals 122. The ToF is generally representative of distance with respect to sound signals or waves because the sound waves move at the speed of sound (e.g., 343 m/s), and ToF and speed of sound can be used to easily calculate distance. Thus, the distance component 326 may determine the distance of the user 106 from the device 104.

At "6," the discriminator component 330 may distinguish between user and non-user objects 128. Generally, non-user objects include static objects in the environment (e.g., non-moving objects such as furniture, walls, etc.), as well as moving objects, but non-user objects (e.g., ceiling and floor fans, blinds or other items blowing in the wind from an open window, etc.). The discriminator component 330 may determine that some objects are static in that the energy values for signals reflecting off those objects do not change across different frames. However, the discriminator component 330 may further determine that there are objects moving in that energy values are changing across frames. The discriminator component 330 may disambiguate between users 106 that are moving in the environment and objects that are moving, but are not user 106. For instance, the discriminator component 330 may determine that objects that are moving in the environment are not changing position based on the ToF values for the reflected signals 122. That is, a ceiling fan or house plant blowing in the wind may have changes in energy values across frames, but the ToF values for those changes in energy values may not significantly change over time which indicates that the moving objects are staying in a same location, or substantially the same location, in the environment.

At "7," the operations component 328 may perform various operations, such as causing various secondary devices to turn on or off (e.g., lights, television, security alarm, etc.), optimize the output of music data to create auditory "sweet spots" for the person as they move through the room, perform more effective beamforming techniques based on the location and/or movement of the user, and so forth. In one illustrative example, the proximity-sensing device may determine whether a user is within a threshold distance (e.g., 3 feet, 4 feet, etc.) to a proximity-sensing device that has a display. If the user is within the threshold distance, the proximity-sensing device may cause content to be presented on the display, or change a size of the content being displayed.

Figure 7B:
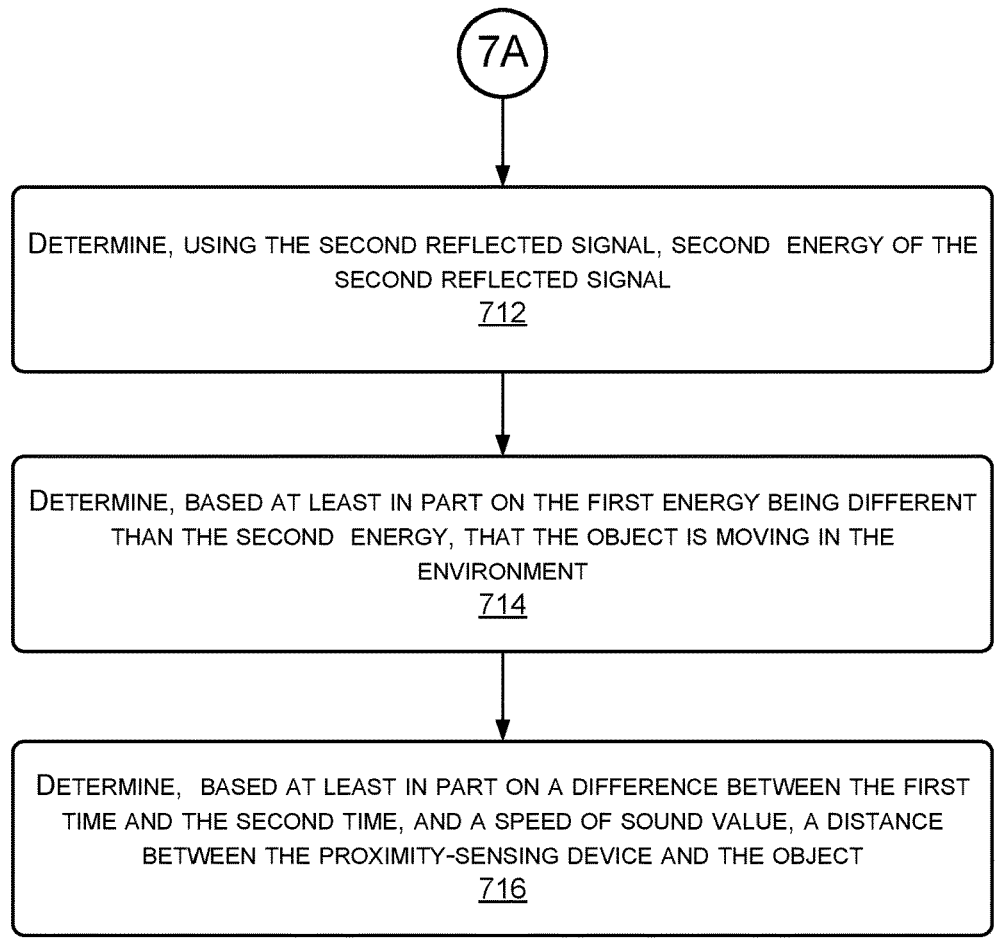

FIGS. 7A and 7B collectively illustrate a flow diagram of an example process 700 for using pulsed ultrasonic signals to detect a distance of an object in an environment, and also a direction in which the object is moving in the environment. The steps of process 700 may be performed by a presence detection device 104 including a microphone 112, a loudspeaker 110, one or more processors 302, and one or more computer-readable media 304 storing computer-executable instructions that, when executed by the one or more processors, cause the one or more processors to perform operations of process 700.

At 702, the proximity-sensing device 104 may cause the loudspeaker to emit a first pulsed ultrasonic signal into an environment of the proximity-sensing device. The first pulsed ultrasonic signal 406 may be a short burst of ultrasonic sound emitted into the environment, and have a configurable waveform.

At 704, the proximity-sensing device 104 may receive, at the microphone, a first reflected signal of the first pulsed ultrasonic signal off an object in the environment. In some examples, the first reflected signal 122 may be received during a collection period 408A.

At 706, the proximity-sensing device 104 may determine, using the first reflected signal, first energy of the first reflected signal. The first energy may generally correspond to or be based on an amplitude of the first reflected signal when received at the proximity-sensing device 104.

At 708, the proximity-sensing device 104 may cause the loudspeaker to emit a second pulsed ultrasonic signal into the environment at a first time. The second pulsed ultrasonic signal 406 may be a short burst of ultrasonic sound emitted into the environment, and have a configurable waveform. The second pulsed ultrasonic signal 406 may be emitted after a collection period 408A after the first pulsed ultrasonic signal 406.

At 710, the proximity-sensing device 104 may receive, at a second time, a second reflected signal of the second pulsed ultrasonic signal off the object. In some examples, the first reflected signal 122 may be received during a second collection period 408B.

At 712, the proximity-sensing device 104 may determine, using the second reflected signal, second energy of the second reflected signal. The second energy may generally correspond to or be based on an amplitude of the second reflected signal when received at the proximity-sensing device 104.

At 714, the proximity-sensing device 104 may determine, based at least in part on the first energy being different than the second energy, that the object is moving in the environment. Increases or decreases in the energy across different frames generally indicates that the object is moving towards or away from the proximity-sensing device 104.

At 716, the proximity-sensing device 104 may determine, based at least in part on a difference between the first time and the second time, and a speed of sound value, a distance between the proximity-sensing device and the object.

In some instances, the distance is a first distance, and the process 700 may further include causing the loudspeaker to emit a third pulsed ultrasonic signal into the environment at a third time, receiving, at a fourth time, a third reflection signal corresponding to a third reflection of the third pulsed ultrasonic signal off the object, determining, using the third time, the fourth time, and the speed of sound value, a second distance between the proximity-sensing device and the object, and determining, based at least in part on the first distance and the second distance, whether the object is moving towards or away from the proximity-sensing device.

In some instances, the process 700 may further include receiving, at the microphone, a third reflected signal of the first pulsed ultrasonic signal off a second object in the environment, determining, using the third reflected signal, third energy of the third reflected signal, receiving, at a third time, a fourth reflected signal of the second pulsed ultrasonic signal off the second object, determining, using the fourth reflected signal, fourth energy of the fourth reflected signal, determining, based at least in part on the third energy being different than the fourth energy, that the second object is moving in the environment, determining, based at least in part on a difference between the first time and the third time, and the speed of sound value, a second distance between the proximity-sensing device and the second object, and determining, based at least in part on the second distance being substantially similar to a previous distance associated with the second object, that the second object is not changing locations in the environment.

Figure 8:
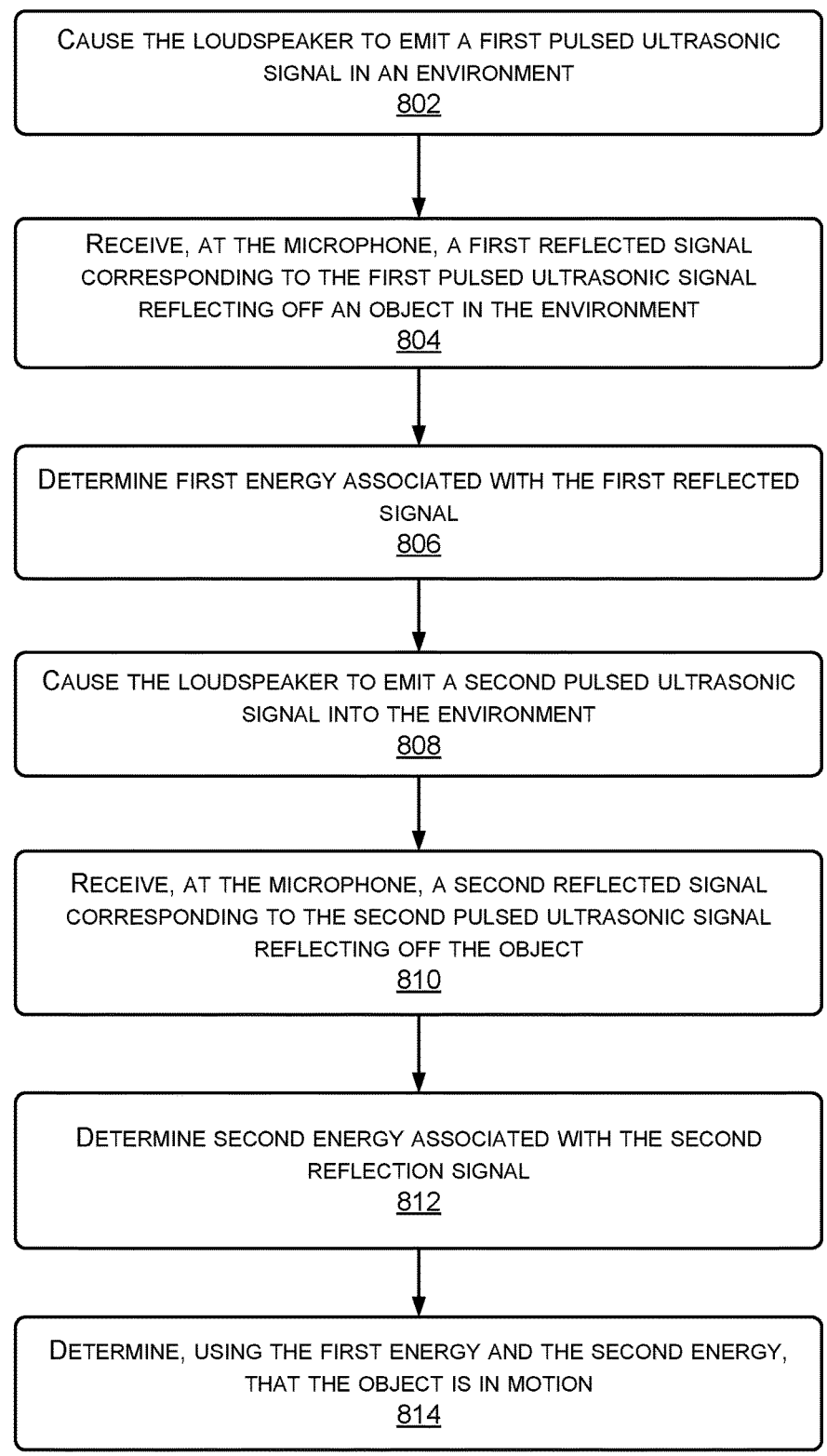
FIG. 8 illustrates a flow diagram of another example process for using multiple pulsed ultrasonic signals to detect that an object is moving in an environment.

FIG. 8 illustrates a flow diagram of another example process 800 for using multiple pulsed ultrasonic signals to detect that an object is moving in an environment.

At 802, a computing device 104 may cause a loudspeaker 110 to emit a first pulsed ultrasonic signal in an environment. The first pulsed ultrasonic signal 406 may be a short burst of ultrasonic sound emitted into the environment, and have a configurable waveform.

At 804, the computing device 104 may receive, at the microphone, a first reflected signal corresponding to the first pulsed ultrasonic signal reflecting off an object in the environment. In some examples, the first reflected signal 122 may be received during a collection period 408A.

At 806, the computing device 104 may determine first energy associated with the first reflected signal. The first energy may generally correspond to or be based on an amplitude of the first reflected signal when received at the proximity-sensing device 104.

At 808, the computing device 104 may cause the loudspeaker to emit a second pulsed ultrasonic signal into the environment. The second pulsed ultrasonic signal 406 may be a short burst of ultrasonic sound emitted into the environment, and have a configurable waveform. The second pulsed ultrasonic signal 406 may be emitted after a collection period 408A after the first pulsed ultrasonic signal 406.

At 810, the computing device 104 may receive, at the microphone, a second reflected signal corresponding to the second pulsed ultrasonic signal reflecting off the object. In some examples, the first reflected signal 122 may be received during a second collection period 408B.

At 812, the computing device 104 may determine second energy associated with the second reflection signal. The second energy may generally correspond to or be based on an amplitude of the second reflected signal when received at the proximity-sensing device 104.

At 814, the computing device 104 may determine, using the first energy and the second energy, that the object is in motion. Generally, increases or decreases in the energy across different frames generally indicates that the object is moving towards or away from the proximity-sensing device 104.

Figure 9A:
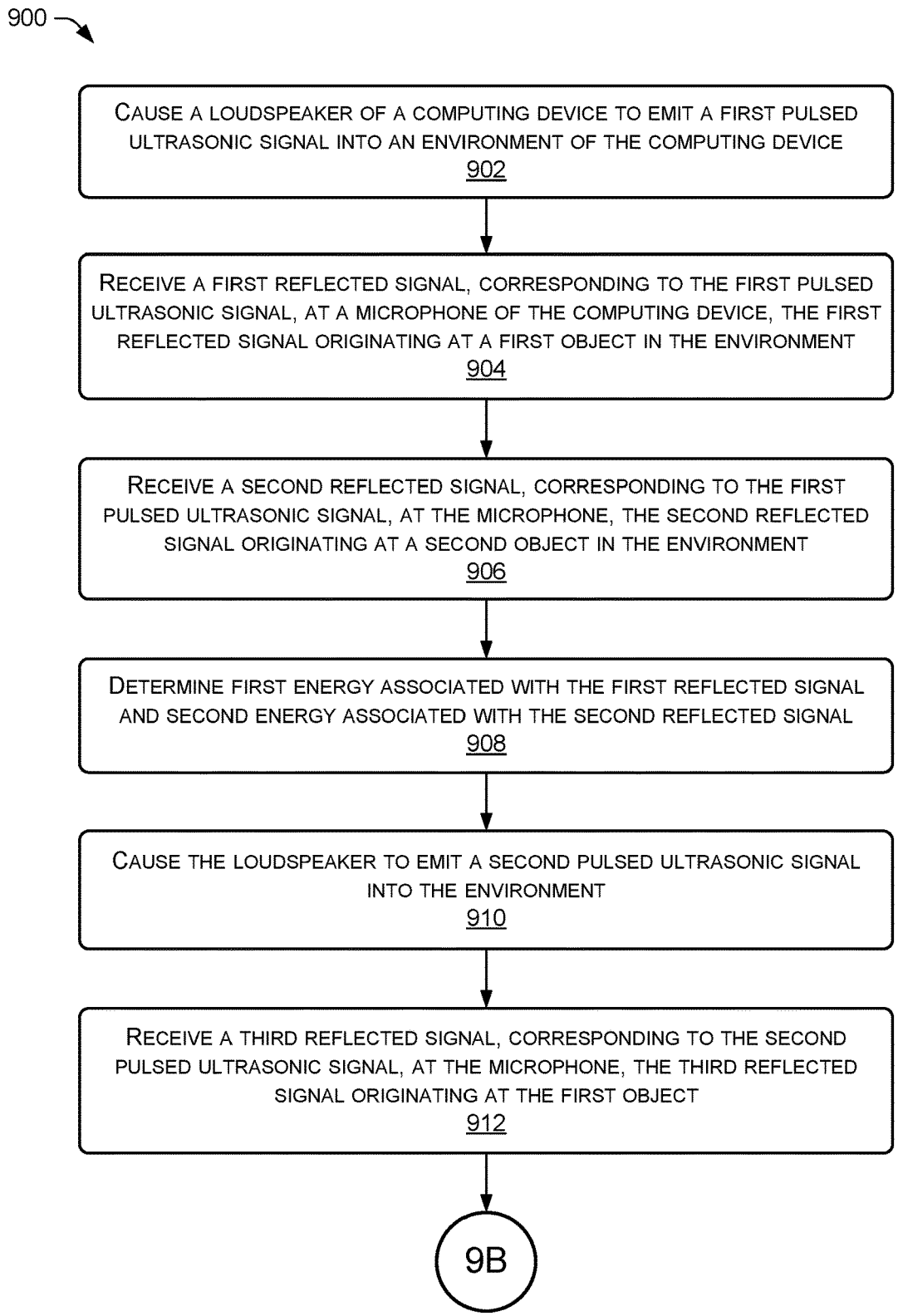

FIGS. 9A and 9B collectively illustrate a flow diagram of an example process 900 for using pulsed ultrasonic signals to detect movement of multiple objects in an environment.

At 902, the proximity-sensing device 104 may cause a loudspeaker of a computing device to emit a first pulsed ultrasonic signal into an environment of the computing device. The first pulsed ultrasonic signal 406 may be a short burst of ultrasonic sound emitted into the environment, and have a configurable waveform.

At 904, the proximity-sensing device 104 may receive a first reflected signal, corresponding to the first pulsed ultrasonic signal, at a microphone of the computing device, the first reflected signal originating at a first object in the environment, and at 906, the proximity-sensing device 104 may receive a second reflected signal, corresponding to the first pulsed ultrasonic signal, at the microphone, the second reflected signal originating at a second object in the environment. In some examples, the first and second reflected signals 122 may be received during a collection period 408A.

At 908, the proximity-sensing device 104 may determine first energy associated with the first reflected signal and second energy associated with the second reflected signal. The first energy and second energy may generally correspond to or be based on an amplitude of the first reflected signal and second reflected signal when received at the proximity-sensing device 104.

At 910, the proximity-sensing device 104 may cause the loudspeaker to emit a second pulsed ultrasonic signal into the environment. The second pulsed ultrasonic signal 406 may be a short burst of ultrasonic sound emitted into the environment, and have a configurable waveform. The second pulsed ultrasonic signal 406 may be emitted after a collection period 408A after the first pulsed ultrasonic signal 406.

At 912, the proximity-sensing device 104 may receive a third reflected signal, corresponding to the second pulsed ultrasonic signal, at the microphone, the third reflected signal originating at the first object, and at 914, the proximity-sensing device 104 may receive a fourth reflected signal, corresponding to the second pulsed ultrasonic signal, at the microphone, the fourth reflected signal originating the second object. In some examples, the first reflected signal 122 and second reflected signal 122 may each be received during a second collection period 408B.

At 916, the proximity-sensing device 104 may determine third energy associated with the third reflected signal and fourth energy associated with the fourth reflection signal. The third energy and fourth energy may generally correspond to or be based on an amplitude of the third reflected signal and fourth reflected signal when received at the proximity-sensing device 104.

At 918, the proximity-sensing device 104 may determine, based at least in part on the first energy and the third energy, that the first object is in motion, and at 920, the proximity-sensing device 104 may determine, based at least in part on the second energy and the fourth energy, that the second object is in motion. Generally, increases or decreases in the energy across different frames generally indicates that the object is moving towards or away from the proximity-sensing device 104.

As used herein, a processor, such as processor(s) 302 may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 302 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 302 may possess its own local memory, which also may store program components, program data, and/or one or more operating systems.

As described herein, computer-readable media and/or memory 304 may include volatile and nonvolatile memory, removable and non-removable media implemented in any method or technology for storage of information, such as computer-readable instructions, data structures, program component, or other data. Such computer-readable media and/or memory 304 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media may be implemented as computer-readable storage media ("CRSM"), which may be any available physical media accessible by the processor(s) 302 to execute instructions stored on the computer-readable media and/or memory 304. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as computer-readable media and/or memory 304, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (Enea OSE) as promulgated by ENEA AB of Sweden; and so forth.

The network interface(s) 338 may enable communications between the proximity-sensing device 104 and other networked devices. Such network interface(s) 338 can include one or more network interface controllers (NICs) or other types of transceiver devices to send and receive communications over a network. For instance, the network interface(s) 338 may include a personal area network (PAN) component to enable communications over one or more short-range wireless communication channels. For instance, the PAN component may enable communications compliant with at least one of the following standards IEEE 802.15.4 (ZigBee), IEEE 802.15.1 (Bluetooth), IEEE 802.11 (WiFi), or any other PAN communication protocol. Furthermore, the network interface(s) 338 may include a wide area network (WAN) component to enable communication over a wide area network. The networks that the proximity-sensing device 104 may communicate over may represent an array of wired networks, wireless networks, such as WiFi, or combinations thereof.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:

1. A proximity-sensing device comprising:
a microphone;
a loudspeaker;
one or more processors; and
one or more computer-readable media storing computer-executable instructions that, when executed by the one or more processors, cause the one or more processors to:
cause the loudspeaker to emit a first pulsed ultrasonic signal into an environment of the proximity-sensing device;
receive, at the microphone, a first reflected signal of the first pulsed ultrasonic signal off an object in the environment;
determine, using the first reflected signal, first energy of the first reflected signal;
cause the loudspeaker to emit a second pulsed ultrasonic signal into the environment at a first time;
receive, at a second time, a second reflected signal of the second pulsed ultrasonic signal off the object;
determine, using the second reflected signal, second energy of the second reflected signal;
determine, based at least in part on the first energy being different than the second energy, that the object is moving in the environment; and
determine, based at least in part on a difference between the first time and the second time, and a speed of sound value, a distance between the proximity-sensing device and the object.

2. The proximity-sensing device of claim 1, wherein the distance is a first distance, comprising further computer-executable instructions that, when executed, cause the one or more processors to:

cause the loudspeaker to emit a third pulsed ultrasonic signal into the environment at a third time;
receive, at a fourth time, a third reflection signal corresponding to a third reflection of the third pulsed ultrasonic signal off the object;
determine, using the third time, the fourth time, and the speed of sound value, a second distance between the proximity-sensing device and the object; and
determine, based at least in part on the first distance and the second distance, whether the object is moving towards or away from the proximity-sensing device.

3. The proximity-sensing device of claim 1, comprising further computer-executable instructions that, when executed, cause the one or more processors to:
receive, at the microphone, a third reflected signal of the first pulsed ultrasonic signal off a second object in the environment;
determine, using the third reflected signal, third energy of the third reflected signal;
receive, at a third time, a fourth reflected signal of the second pulsed ultrasonic signal off the second object;
determine, using the fourth reflected signal, fourth energy of the fourth reflected signal;
determine, based at least in part on the third energy being different than the fourth energy, that the second object is moving in the environment;
determine, based at least in part on a difference between the first time and the third time, and the speed of sound value, a second distance between the proximity-sensing device and the second object; and
determine, based at least in part on the second distance being substantially similar to a previous distance associated with the second object, that the second object is not changing locations in the environment.

4. The proximity-sensing device of claim 1, wherein the object is a first object and the distance is a first distance, comprising further computer-executable instructions that, when executed, cause the one or more processors to:
receive, at the microphone, a third reflected signal of the first pulsed ultrasonic signal off a second object in the environment;
determine, using the third reflected signal, third energy of the third reflected signal;
receive, at a third time, a fourth reflected signal of the second pulsed ultrasonic signal off the second object;
determine, using the fourth reflected signal, fourth energy of the fourth reflected signal;
determine, based at least in part on the third energy being different than the fourth energy, that the second object is moving in the environment;
determine, based at least in part on a difference between the first time and the third time, and the speed of sound value, a second distance between the proximity-sensing device and the second object; and
determine, based at least in part on the first distance being different than the second distance, that the second object is different than the first object.

5. A computing device comprising:
a loudspeaker;
a microphone;
one or more processors; and
one or more computer-readable media storing computer-executable instructions that, when executed by the one or more processors, cause the one or more processors to:
cause the loudspeaker to emit a first pulsed ultrasonic signal in an environment;
receive, at the microphone, a first reflected signal corresponding to the first pulsed ultrasonic signal reflecting off an object in the environment;
determine first energy associated with the first reflected signal;
cause the loudspeaker to emit a second pulsed ultrasonic signal into the environment;
receive, at the microphone, a second reflected signal corresponding to the second pulsed ultrasonic signal reflecting off the object;
determine second energy associated with the second reflection signal; and
determine, using the first energy and the second energy, that the object is in motion.

6. The computing device of claim 5, comprising further computer-executable instructions that, when executed, cause the one or more processors to:
identify a first time associated with the second pulsed ultrasonic signal being emitted into the environment;
identify a second time associated with the second reflection signal being received at the computing device;
determine, using the first time and the second time, a distance between the computing device and the object at the second time;
determine that the distance between the computing device and the object is less than or equal to a threshold distance; and
based at least in part on the distance being less than or equal to the threshold distance, cause the computing device to perform an operation.

7. The computing device of claim 5, comprising further computer-executable instructions that, when executed, cause the one or more processors to:
identify a first time associated with the second pulsed ultrasonic signal being emitted into the environment;
receive, at the microphone, a third reflected signal of the first pulsed ultrasonic signal off a second object in the environment;
determine, using the third reflected signal, third energy of the third reflected signal;
receive, at a second time, a fourth reflected signal of the second pulsed ultrasonic signal off the second object;
determine, using the fourth reflected signal, fourth energy of the fourth reflected signal;
determine, based at least in part on the third energy being different than the fourth energy, that the second object is moving in the environment;
determine, based at least in part on a difference between the first time and the second time, a second distance between the computing device and the second object; and
determine, based at least in part on the second distance being substantially similar to a previous distance associated with the second object, that the second object is not changing locations in the environment.

8. The computing device of claim 5, comprising further computer-executable instructions that, when executed, cause the one or more processors to:
receive a third reflected signal corresponding to the first pulsed ultrasonic signal reflecting off another object in the environment;
receive a fourth reflected signal corresponding to the second pulsed ultrasonic signal reflecting off the other object;
determine third energy associated with the third reflection signal;

determine fourth energy associated with the fourth reflection signal;
determine a first difference between the first energy and the second energy;
determine a second difference between the third energy and the fourth energy;
determine that the first difference is greater than the second difference; and
based at least in part on the first difference being greater than the second difference, calculate a distance between the object and the computing device.

9. The computing device of claim 5, comprising further computer-executable instructions that, when executed, cause the one or more processors to:
identify a first time associated with the second pulsed ultrasonic signal being emitted into the environment;
identify a second time associated with the second reflection signal being received at the computing device;
determine, using the first time and the second time, a first distance between the computing device and the object;
cause the loudspeaker to emit a third pulsed ultrasonic signal into the environment at a third time;
receive, at a fourth time, a third reflection signal corresponding to a third reflection of the third pulsed ultrasonic signal off the object;
determine, using the third time and the fourth time, a second distance between the computing device and the object; and
determine, based at least in part on the first distance and the second distance, whether the object is moving towards or away from the computing device.

10. The computing device of claim 9, wherein the object is a first object, comprising further computer-executable instructions that, when executed, cause the one or more processors to:
receive, at the microphone, a third reflected signal of the first pulsed ultrasonic signal off a second object in the environment, the third reflected signal being received at a third energy;
receive, at a third time, a fourth reflected signal of the second pulsed ultrasonic signal off the second object, the fourth reflected signal being received at a fourth energy;
determine, based at least in part on the third energy being different than the fourth energy, that the second object is moving in the environment;
determine, based at least in part on a difference between the first time and the third time, a second distance between the computing device and the second object at the third time; and
determine, based at least in part on the first distance being different than the second distance, that the second object is different than the first object.

11. The computing device of claim 5, wherein the first pulsed ultrasonic signal and second pulsed ultrasonic signal are emitted for a first period of time, comprising further computer-executable instructions that, when executed, cause the one or more processors to:
cause the loudspeaker to refrain from emitting an ultrasonic signal for a second period of time between emission of the first pulsed ultrasonic signal and the second pulsed ultrasonic signal,
wherein the second period of time is greater than the first period of time.

12. The computing device of claim 5, wherein the object is a first object, comprising further computer-executable instructions that, when executed, cause the one or more processors to:
determine third energy of a third reflection signal corresponding to the first pulsed ultrasonic signal reflecting off a second object in the environment;
determine fourth energy of a fourth reflection signal corresponding to the second pulsed ultrasonic signal reflecting off the second object;
determine a difference between the third energy and the fourth energy; and
determine, based at least in part on the difference, that the second object is not in motion.

13. The computing device of claim 5, comprising further computer-executable instructions that, when executed, cause the one or more processors to:
identify a first time associated with the second pulsed ultrasonic signal being emitted into the environment;
identify a second time associated with the second reflection signal being received at the computing device;
determine, using the first time and the second time, a first distance between the computing device and the object;
cause the loudspeaker to emit a third pulsed ultrasonic signal into the environment at a third time;
receive, at a fourth time, a third reflection signal corresponding to a third reflection of the third pulsed ultrasonic signal off the object;
determine, using the third time and the fourth time, a second distance between the computing device and the object;
determine, based at least in part on the first distance and the second distance, whether the object is moving towards the computing device or away from the computing device; and
in response to determining that the object is moving towards the computing device, causing the computing device to perform a first operation; or
in response to determining that the object is moving away from the computing device, causing the computing device to perform a second operation that is different from the first operation.

14. A method comprising:
causing a loudspeaker of a computing device to emit a first pulsed ultrasonic signal into an environment of the computing device;
receiving a first reflected signal, corresponding to the first pulsed ultrasonic signal, at a microphone of the computing device, the first reflected signal originating at a first object in the environment;
receiving a second reflected signal, corresponding to the first pulsed ultrasonic signal, at the microphone, the second reflected signal originating at a second object in the environment;
determining first energy associated with the first reflected signal and second energy associated with the second reflected signal;
causing the loudspeaker to emit a second pulsed ultrasonic signal into the environment;
receiving a third reflected signal, corresponding to the second pulsed ultrasonic signal, at the microphone, the third reflected signal originating at the first object;
receiving a fourth reflected signal, corresponding to the second pulsed ultrasonic signal, at the microphone, the fourth reflected signal originating the second object;

determining third energy associated with the third reflected signal and fourth energy associated with the fourth reflection signal;

determining, based at least in part on the first energy and the third energy, that the first object is in motion; and determining, based at least in part on the second energy and the fourth energy, that the second object is in motion.

15. The method of claim 14, further comprising:

identifying a first time associated with the second pulsed ultrasonic signal being emitted;

identifying a second time associated with the third reflection signal being received;

identifying a third time associated with the fourth reflection signal being received;

determining, using the first time and the second time, a first distance between the computing device and the first object;

determining, using the first time and the third time, a second distance between the computing device and the second object; and determining that the first object is different than the second object based at least in part on the first distance being different than the second distance.

16. The method of claim 14, further comprising:

identifying a first time associated with the second pulsed ultrasonic signal being emitted;

identifying a second time associated with the third reflection signal being received;

determining, using the first time and the second time, a distance between the computing device and the first object;

determining that the distance between the computing device and the first object is less than or equal to a threshold distance; and based at least in part on the distance being less than or equal to the threshold distance, causing the computing device to perform an operation.

17. The method of claim 14, further comprising:

identifying a first time associated with the second pulsed ultrasonic signal being emitted into the environment;

identifying a second time associated with the fourth reflected signal being received at the computing device;

determining, based at least in part on a difference between the first time and the second time, a second distance between the computing device and the second object; and determine, based at least in part on the second distance being substantially similar to a previous distance associated with the second object, that the second object is not changing locations in the environment.

18. The method of claim 14, further comprising:

identifying a first time associated with the first pulsed ultrasonic signal being emitted;

identifying a second time associated with the first reflection signal being received;

determining, using the first time and the second time, a first distance between the computing device and the first object;

identifying a third time associated with the second pulsed ultrasonic signal being emitted;

identifying a fourth time associated with the third reflection signal being received;

determining, using the third time and the fourth time, a second distance between the computing device and the first object;

determining, based at least in part on the first distance and the second distance, a direction in which the first object is moving.

19. The method of claim 14, further comprising:

analyzing first audio data stored in an audio buffer of the computing device, wherein an analog equivalent of the first audio data is associated with a first frequency range that is less than 20 kilo-hertz (kHz);

identifying a portion of the first audio data with which to mix second audio data representing the second pulsed ultrasonic signal, wherein an analog equivalent of the second audio data is associated with a second frequency range that is greater than 20 kHz; and mixing the portion of the first audio data with the second audio data representing the ultrasonic signal to generate mixed audio data, wherein causing the loudspeaker to emit the second pulsed ultrasonic signal comprises causing the loudspeaker to output sound represented by the mixed audio data.

20. The method of claim 14, wherein the first pulsed ultrasonic signal and second pulsed ultrasonic signal are emitted for a first period of time, further comprising:

causing the loudspeaker to refrain from emitting an ultrasonic signal for a second period of time between emission of the first pulsed ultrasonic signal and the second pulsed ultrasonic signal, wherein the second period of time is greater than the first period of time.

* * * * *